United States Patent
Khoshnevisan et al.

(10) Patent No.: US 11,638,221 B2
(45) Date of Patent: Apr. 25, 2023

(54) FEEDBACK POWER CONTROL TECHNIQUES FOR WIRELESS COMMUNICATIONS SYSTEMS

(71) Applicant: QUALCOMM Incorporated, San Diego, CA (US)

(72) Inventors: Mostafa Khoshnevisan, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/169,386

(22) Filed: Feb. 5, 2021

(65) Prior Publication Data
US 2021/0250880 A1    Aug. 12, 2021

Related U.S. Application Data

(60) Provisional application No. 62/975,679, filed on Feb. 12, 2020.

(51) Int. Cl.
*H04W 4/00* (2018.01)
*H04W 52/48* (2009.01)
*H04W 52/18* (2009.01)
*H04W 72/23* (2023.01)
*H04L 1/1812* (2023.01)

(52) U.S. Cl.
CPC .......... *H04W 52/48* (2013.01); *H04W 52/18* (2013.01); *H04W 72/23* (2023.01); *H04L 1/1812* (2013.01)

(58) Field of Classification Search
CPC .... H04W 52/48; H04W 52/18; H04W 72/042
See application file for complete search history.

(56) References Cited

U.S. PATENT DOCUMENTS

2012/0155337 A1* 6/2012 Park ................ H04L 5/0055
                                                                  370/280
2013/0195066 A1* 8/2013 Lee .................. H04W 72/0413
                                                                  370/329

(Continued)

FOREIGN PATENT DOCUMENTS

CN           110521155 A      11/2019

OTHER PUBLICATIONS

3GPP TS 38.213: "3rd Generation Partnership Project; Technical Specification Group Radio Access Network; NR; Physical Layer Procedures Control (Release 16)", 3GPP Standard, Technical Specification, 3GPP TS 38.213, 3rd Generation Partnership Project (3GPP), Mobile Competence Centre, 650, Route Des Lucioles, F-06921, Sophia-Antipolis Cedex, France, vol. RAN WG1, No. V16.0.0, (Dec. 2019), pp. 1-146, Jan. 14, 2020 (Jan. 14, 2020), XP051860806, Retrieved from the Internet: URL: http://ftp.3gpp.org/Specs/archive/38_series/38.213/38213-g00.zip 38213-g00.docx [retrieved on Jan. 14, 2020] Section 10.1; p. 100, Section 10.3, Paragraph [09.1]. clause 7.2.1; p. 23-p. 25, clause 9; p. 49, paragraph 3 clause 9.1; p. 49, paragraph 4-paragraph 15 clause 9.1.1; p. 50, paragraph 5-paragraph 6 clause 9.1.2.1; p. 55 clause 9.1.3; p. 57, paragraph 8 clause 9.1.3.1; p. 61, paragraph 1-paragraph 2 clause 9.1.3.2; p. 63, paragraph 6 clause 9.1.3.3; p. 64, paragraph 1-p. 65, paragraph 10, p. 56. paragraph 6-p. 57, paragraph 1 ch. 9.2.3, p. 73, paragraph, 5 p. 44, paragraph 8, p. 10, paragraph 1 p. 105-p. 106; tables 10.2-1. 10.2-2.

(Continued)

*Primary Examiner* — Abdelnabi O Musa
(74) *Attorney, Agent, or Firm* — Holland & Hart LLP

(57) ABSTRACT

Methods, systems, and devices for wireless communications are described. A user equipment (UE) may receive first downlink control information corresponding to a first group of downlink transmissions and second downlink control information corresponding to a second group of downlink (Continued)

transmissions. The UE may calculate a number of information bits for a feedback message including first feedback for one or more downlink transmissions of the first group and second feedback for one or more downlink transmissions of the second group. The number of information bits may include first information bits of the first feedback and second information bits of the second feedback. The UE may identify a transmission power for the feedback message based on the calculated number of information bits. The UE may transmit the feedback message including the first feedback and the second feedback using the identified transmission power.

31 Claims, 10 Drawing Sheets

(56) References Cited

U.S. PATENT DOCUMENTS

| | | | | |
|---|---|---|---|---|
| 2016/0204906 A1* | 7/2016 | Cheng | ........ | H04L 1/1861 370/280 |
| 2021/0227458 A1* | 7/2021 | Khoshnevisan | ...... | H04W 48/20 |
| 2021/0314102 A1* | 10/2021 | Li | ........ | H04L 1/1614 |
| 2021/0321438 A1* | 10/2021 | Khoshnevisan | ..... | H04B 7/0482 |
| 2021/0351872 A1* | 11/2021 | Khoshnevisan | ...... | H04L 1/1854 |
| 2022/0116171 A1* | 4/2022 | Zhang | ......... | H04L 1/0003 |

OTHER PUBLICATIONS

"3rd Generation Partnership Project; Technical Specification Group Radio Access Network; NR; Physical layer procedures for control (Release 16)," 3GPP Standard; Technical Specification; 3GPP TS 38.213, 3rd Generation Partnership Project (3GPP), Mobile Competence Centre, 650, Route Des Lucioles, F-06921, Sophia-Antipolis Cedex, France, vol. RAN WG1, No. V16.3.0, Oct. 2, 2020 (Oct. 2, 2020), pp. 1-179, XP051961308, Retrieved from the Internet: URL: http://ftp.3gpp.org/Specs/archive/38_series/38.213/ 38213-g30.zip 38213-g30.docx [retrieved on Oct. 2, 2020] clause 7.2.1; p. 24-p. 26 clauses 9 & 9.1; p. 49-p. 76 clause 9.2; p. 77, paragraph 1-paragraph 4, p. 81, paragraph 14-p. 82. Paragraph 1, p. 47, paragraph 3, p. 76. paragraph 7-paragraph 10.
International Search Report and Written Opinion—PCT/US2021/ 017030—ISA/EPO—dated May 7, 2021 (202353WO).

* cited by examiner

FEEDBACK POWER CONTROL TECHNIQUES FOR WIRELESS COMMUNICATIONS SYSTEMS

CROSS REFERENCE

The present application for patent claims the benefit of U.S. Provisional Patent Application No. 62/975,679 by KHOSHNEVISAN et al., entitled "FEEDBACK POWER CONTROL TECHNIQUES FOR WIRELESS COMMUNICATIONS SYSTEMS," filed Feb. 12, 2020, assigned to the assignee hereof, and expressly incorporated by reference herein in its entirety.

FIELD OF TECHNOLOGY

The present disclosure relates to wireless communications and more specifically to feedback power control techniques for wireless communications systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE and base station may use hybrid automatic repeat request (HARQ) feedback for communications between the devices. The HARQ feedback may be used to identify and correct for errors in transmitted data, where the feedback may include an acknowledgment (ACK) or a negative acknowledgment (NACK). In some cases, the UE may transmit feedback for one or more groups of downlink transmissions from the base station. However, the UE may be unable to accurately implement power control for transmitting such feedback, which may result in inefficient communications, reduced battery life, or the like.

SUMMARY

The described techniques relate to improved methods, systems, devices, and apparatuses that support feedback power control techniques for wireless communications systems. Generally, the described techniques enable a user equipment (UE) to accurately identify a transmission power for one or more feedback messages. For example, a wireless communications system may support codebook-based hybrid automatic repeat request (HARQ) feedback (e.g., HARQ using an enhanced dynamic codebook). In such systems, a UE may transmit, to a base station, a number of information bits within a HARQ-acknowledgment (ACK) codebook. As an example, the UE may monitor for control information (e.g., downlink control information (DCI)) during one or more monitoring occasions, where the control information may indicate one or more scheduled downlink transmissions (e.g., including data transmitted via a physical downlink shared channel (PDSCH)) for the UE. The UE may indicate whether each downlink transmission was successfully detected and received (e.g., decoded) using respective information bits (e.g., feedback bits such as an ACK bit or a negative acknowledgment (NACK) bit). In addition, different downlink transmissions may be associated with different groups (e.g., a first scheduled PDSCH may be associated with a first group, a second scheduled PDSCH may be associated with a second group, and so forth), and DCI may indicate which group a scheduled downlink transmission is associated with. The UE may accordingly report first feedback (e.g., one or more information bits) corresponding to one or more downlink transmissions of the first group, where the first feedback may include a first HARQ-ACK codebook associated with the first group. Additionally or alternatively, the UE may report second feedback (e.g., one or more information bits) corresponding to one or more downlink transmissions of the second group. The second feedback may include a second HARQ-ACK codebook associated with the second group.

The UE may identify a transmission power for reporting the feedback (e.g., the first feedback and/or the second feedback) to the base station based on a number of information bits. The UE may calculate the number of information bits in accordance with the techniques described herein. For example, the UE may determine (e.g., calculate) the number of HARQ-ACK information bits based on one or more terms corresponding to one or more groups of downlink transmissions. Such a term may include a number of feedback information bits of the first feedback due to DCI messages the UE failed to receive or decode, a number of transport blocks (TBs) of a corresponding group received by the UE, or both. In some examples, the UE may calculate the number of information bits based on one or more parameters, such as a downlink assignment index (DAI) (e.g., a last DAI in a set of DAIS for a group), a predetermined threshold (e.g., a maximum) number of TBs per downlink transmission, a HARQ-ACK information request indication, among other examples of parameters as described herein.

A method of wireless communications at a UE is described. The method may include receiving first DCI corresponding to a first group of downlink transmissions and second DCI corresponding to a second group of downlink transmissions, calculating a number of information bits for a feedback message including first feedback for one or more downlink transmissions of the first group and second feedback for one or more downlink transmissions of the second group, the number of information bits including first information bits of the first feedback and second information bits of the second feedback, identifying a transmission power for the feedback message based on the calculated number of information bits, and transmitting the feedback message including the first feedback and the second feedback using the identified transmission power.

An apparatus for wireless communications at a UE is described. The apparatus may include a processor, memory coupled with the processor, and instructions stored in the memory. The instructions may be executable by the processor to cause the apparatus to receive first DCI corresponding to a first group of downlink transmissions and second DCI corresponding to a second group of downlink transmissions, calculate a number of information bits for a feedback message including first feedback for one or more downlink transmissions of the first group and second feedback for one or more downlink transmissions of the second group, the number of information bits including first information bits of the first feedback and second information bits of the second feedback, identify a transmission power for the feedback message based on the calculated number of information bits, and transmit the feedback message including the first feedback and the second feedback using the identified transmission power.

Another apparatus for wireless communications at a UE is described. The apparatus may include means for receiving first DCI corresponding to a first group of downlink transmissions and second DCI corresponding to a second group of downlink transmissions, calculating a number of information bits for a feedback message including first feedback for one or more downlink transmissions of the first group and second feedback for one or more downlink transmissions of the second group, the number of information bits including first information bits of the first feedback and second information bits of the second feedback, identifying a transmission power for the feedback message based on the calculated number of information bits, and transmitting the feedback message including the first feedback and the second feedback using the identified transmission power.

A non-transitory computer-readable medium storing code for wireless communications at a UE is described. The code may include instructions executable by a processor to receive first DCI corresponding to a first group of downlink transmissions and second DCI corresponding to a second group of downlink transmissions, calculate a number of information bits for a feedback message including first feedback for one or more downlink transmissions of the first group and second feedback for one or more downlink transmissions of the second group, the number of information bits including first information bits of the first feedback and second information bits of the second feedback, identify a transmission power for the feedback message based on the calculated number of information bits, and transmit the feedback message including the first feedback and the second feedback using the identified transmission power.

In some examples of the method, apparatuses, and non-transitory computer-readable medium described herein, calculating the number of information bits for the feedback message may include operations, features, means, or instructions for calculating the first information bits of the first feedback, where the first information bits of the first feedback includes one or more feedback bits corresponding to DCI for the first group that the UE failed to receive and one or more feedback bits corresponding to a quantity of TBs of the first group received by the UE.

Some examples of the method, apparatuses, and non-transitory computer-readable medium described herein may further include operations, features, means, or instructions for receiving third DCI corresponding to the first group and fourth DCI corresponding to the second group, the third DCI being a last DCI message prior to transmitting the feedback message and received after the fourth DCI, identifying a value of a DAI of the third DCI, the value of the DAI indicating a total number of DCI messages of the first group transmitted to the UE from a base station, and calculating a difference between the value of the DAI and a number of DCI messages associated with the first group received by the UE, where calculating the first information bits of the first feedback may be based on the calculated difference.

In some examples of the method, apparatuses, and non-transitory computer-readable medium described herein, calculating the first information bits of the first feedback may include operations, features, means, or instructions for multiplying the calculated difference by a predetermined threshold number of TBs per downlink shared channel.

In some examples of the method, apparatuses, and non-transitory computer-readable medium described herein, calculating the number of information bits for the feedback message may include operations, features, means, or instructions for calculating the second information bits of the second feedback, where the second information bits of the second feedback includes one or more feedback bits corresponding to DCI for the second group that the UE failed to receive and one or more feedback bits corresponding to a quantity of TBs of the second group received by the UE.

Some examples of the method, apparatuses, and non-transitory computer-readable medium described herein may further include operations, features, means, or instructions for receiving third DCI corresponding to the first group and fourth DCI corresponding to the second group, the fourth DCI being a last DCI message prior to transmitting the feedback message and received after the third DCI, identifying a value of a DAI of the fourth DCI, the value of the DAI indicating a total number of DCI messages of the second group transmitted to the UE from a base station, and calculating a difference between the value of the DAI and a number of DCI messages associated with the second group received by the UE, where calculating the second information bits of the second feedback may be based on the calculated difference.

In some examples of the method, apparatuses, and non-transitory computer-readable medium described herein, calculating the second information bits of the second feedback may include operations, features, means, or instructions for multiplying the calculated difference by a predetermined threshold number of TBs per downlink shared channel.

Some examples of the method, apparatuses, and non-transitory computer-readable medium described herein may further include operations, features, means, or instructions for receiving third DCI corresponding to the first group and fourth DCI corresponding to the second group, the third DCI being a last DCI message prior to transmitting the feedback message and received after the fourth DCI, identifying a value of a DAI of the third DCI, the value of the DAI indicating a total number of DCI messages of the second group transmitted to the UE from a base station, and calculating a difference between the value of the DAI and a number of DCI messages associated with the second group received by the UE, where calculating the second information bits of the second feedback may be based on the calculated difference.

Some examples of the method, apparatuses, and non-transitory computer-readable medium described herein may further include operations, features, means, or instructions for identifying one or more parameters of the first DCI, the second DCI, or both, generating the first feedback corresponding to the first group based on the one or more parameters, and generating the second feedback corresponding to the second group based on the one or more parameters.

In some examples of the method, apparatuses, and non-transitory computer-readable medium described herein, the one or more parameters of the first DCI includes an indication that the first DCI corresponds to the first group, a first new feedback indication field corresponding to the first group, a second new feedback indication field corresponding to the second group, an indication for the UE to generate the first feedback, an indication for the UE to generate both the first feedback and the second feedback, a DAI corresponding to the first group, a DAI corresponding to the second group, or any combination thereof.

In some examples of the method, apparatuses, and non-transitory computer-readable medium described herein, the one or more parameters of the second DCI includes an indication that the second DCI corresponds to the second group, a first new feedback indication field corresponding to the first group, a second new feedback indication field corresponding to the second group, an indication for the UE to generate the second feedback, an indication for the UE to generate both the first feedback and the second feedback, a DAI corresponding to the first group, a DAI corresponding to the second group, or any combination thereof.

In some examples of the method, apparatuses, and non-transitory computer-readable medium described herein, generating the first feedback may include operations, features, means, or instructions for generating an information bit for a first TB scheduled by the first DCI, where a first entry of a first codebook corresponds to the first DCI and includes the information bit for the first TB.

Some examples of the method, apparatuses, and non-transitory computer-readable medium described herein may further include operations, features, means, or instructions for generating an information bit for a second TB scheduled by the first DCI, where the first entry of the first codebook includes the information bit for the second TB.

Some examples of the method, apparatuses, and non-transitory computer-readable medium described herein may further include operations, features, means, or instructions for identifying a threshold number of TBs scheduled by DCI, and appending one or more NACK bits to the first entry of the first codebook, where a size of the first entry of the first codebook matches the threshold number of TBs.

In some examples of the method, apparatuses, and non-transitory computer-readable medium described herein, an information bit of the number of information bits indicates an ACK or a NACK.

Some examples of the method, apparatuses, and non-transitory computer-readable medium described herein may further include operations, features, means, or instructions for receiving, from a base station, a configuration of an enhanced dynamic codebook for HARQ feedback, where the feedback message may be transmitted in accordance with the configuration.

In some examples of the method, apparatuses, and non-transitory computer-readable medium described herein, the feedback message may be transmitted via uplink control information (UCI) of a physical uplink control channel.

In some examples of the method, apparatuses, and non-transitory computer-readable medium described herein, a payload of the UCI may be less than or equal to 11 bits.

DETAILED DESCRIPTION

Figure 1:
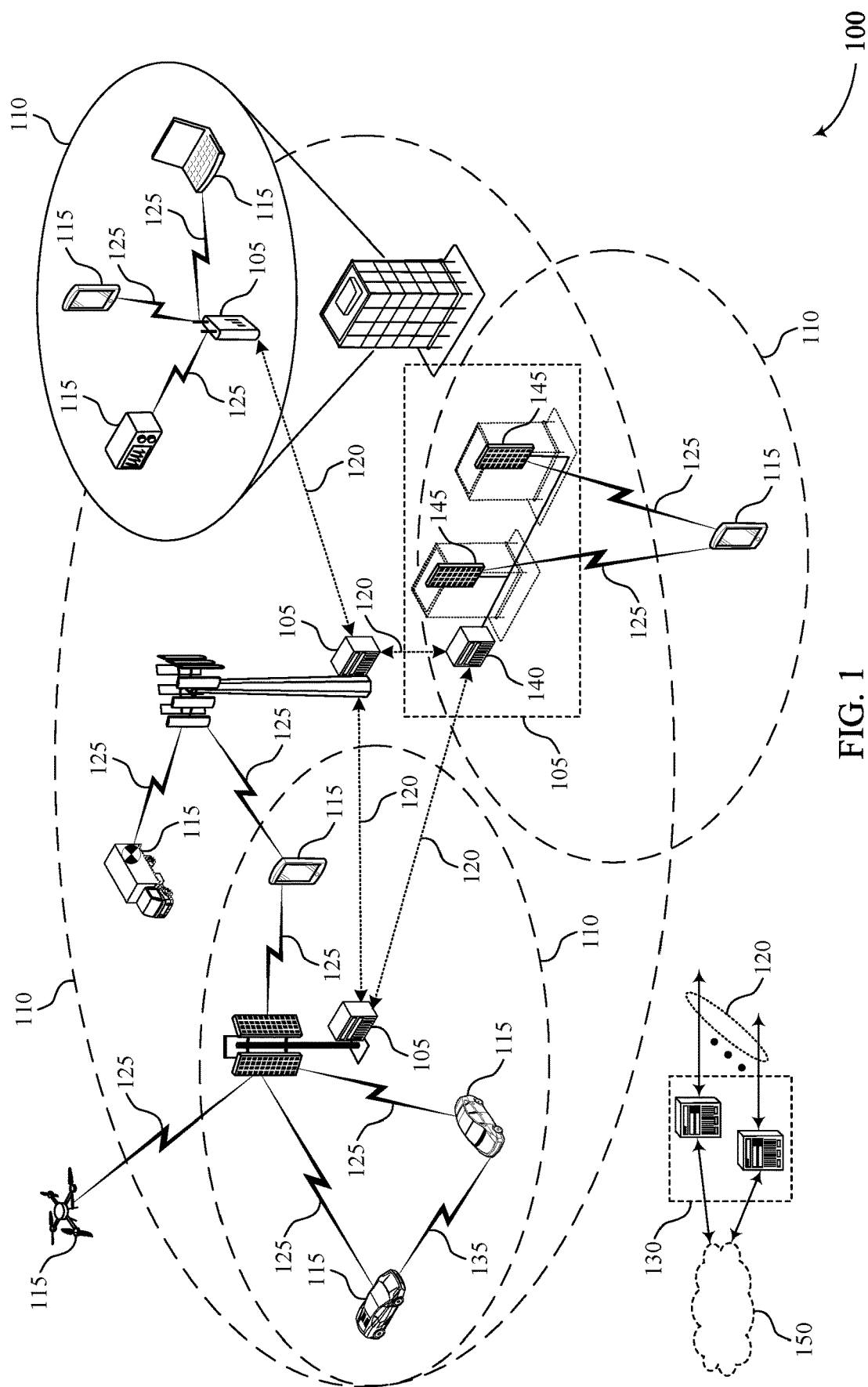
FIG. 1 illustrates an example of a wireless communications system that supports feedback power control techniques for wireless communications systems in accordance with aspects of the present disclosure.

In some wireless communications systems, a user equipment (UE) may use hybrid automatic repeat request (HARQ) feedback to ensure reception of data transmitted within the system. For example, a UE may send HARQ feedback transmissions that include an acknowledgment (ACK) or negative acknowledgment (NACK) for data transmitted to the UE. In some cases, a flexible frame structure and dynamic indications of HARQ feedback timing may be used. As such, a time offset between reception of a downlink message (e.g., a physical downlink shared channel (PDSCH), a physical downlink control channel (PDCCH), etc.) and transmission of corresponding HARQ feedback may be variable. The system may also utilize codebook-based HARQ feedback, where multiple HARQ feedback indications (e.g., ACK/NACK) may be transmitted simultaneously on a single feedback occasion (e.g., within a feedback report), and respective information bits representing detected messages may be encoded in a HARQ-ACK codebook.

In some cases, a UE may transmit different types of HARQ-ACK codebooks. For instance, a semi-static codebook may be used, where a HARQ feedback bit for a potential downlink message may be reserved in a semi-static codebook (e.g., of a fixed size, regardless of the actual transmission of the downlink message). Additionally or alternatively, a dynamic codebook may be used, where information bits may be conditionally added to the codebook based on, for example, the detection of a downlink message (e.g., a downlink control information (DCI) message). Here, the UE may construct a codebook having a size that corresponds to the number of downlink transmissions detected and the corresponding information bits included in the HARQ-ACK codebook, which may reduce overhead in feedback signaling.

In some examples, one or more downlink transmissions from the base station may be configured or organized into groups. In such examples, the UE may be configured to provide group-based HARQ feedback to the base station, which may realize efficient communications in the wireless communications system. Group-based feedback may also be referred to as enhanced dynamic acknowledgment feedback, and a group-based acknowledgment feedback codebook may be referred to as an enhanced dynamic codebook. Using such codebook-based HARQ feedback schemes, the UE may determine feedback for each group of downlink transmissions. For example, the UE may identify first feedback (e.g., a first HARQ-ACK codebook) for a first group, second feedback (e.g., a second HARQ-ACK codebook) for a second group, etc. Such feedback may include an indication of whether the UE successfully received and decoded the one or more downlink transmissions for each group (e.g., an ACK indicating successful decoding of a downlink transmission or a NACK indicating a failed reception or a failed decoding of the downlink transmission). However, in some cases, the UE may be unable to accurately implement power control for reporting the feedback. For example, the UE may be unable to calculate a number of HARQ-ACK bits of the feedback for different groups of downlink transmissions (e.g., due to separate downlink assignment index (DAI) counting processes associated with each group).

As described herein, techniques may be used to identify a number of information bits (e.g., a number of HARQ feedback bits) for one or more groups of downlink transmissions. Such techniques may enable a UE to accurately identify a transmission power for a feedback message indicating information bits for the one or more groups, which may realize enhanced power savings and ensure reliable communications, among other advantages. The UE may receive one or more DCI messages corresponding to one or more groups of downlink transmissions. The UE may calculate a number of information bits for a feedback message based on the received DCI messages. For example, the UE may determine feedback information bits of a first group to include in a feedback message, feedback information bits of a second group to include in the feedback message, etc., based on one or more parameters of the DCI messages as described herein. The one or more parameters may include one or more DAIs, a predetermined threshold number of transport blocks (TBs) per downlink transmission (e.g., per PDSCH transmission), a HARQ-ACK information request indication, among other examples of parameters.

The UE may calculate the number of information bits for the feedback message based on the feedback of the first group, the feedback of the second group, or both. For example, the UE may determine a first term of the first group. The first term may include a number of feedback information bits of the first feedback due to DCI messages the UE failed to receive, a number of TBs of the first group that the UE received, or both. The UE may calculate the number of information bits using such a term for each group (e.g., a first term for the first group, a second term for the second group, etc.), which may enable the UE to accurately identify a transmission power for the feedback message.

Aspects of the disclosure are initially described in the context of wireless communications systems. Aspects of the disclosure are then described with reference to examples of feedback schemes. Aspects of the disclosure are further illustrated by and described with reference to apparatus diagrams, system diagrams, and flowcharts that relate to feedback power control techniques for wireless communications systems.

FIG. 1 illustrates an example of a wireless communications system 100 that supports feedback power control techniques for wireless communications systems in accordance with aspects of the present disclosure. The wireless communications system 100 may include one or more base stations 105, one or more UEs 115, and a core network 130.

In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

In some systems, a frame structure may be used to organize physical resources. A frame may be a 10 ms interval that may be further divided into 10 equally sized sub-frames. Each sub-frame may include two consecutive time slots. Each slot may include 6 or 7 OFDMA symbol periods. A resource element includes one symbol period and one subcarrier (a 15 kHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. Some resource elements may include downlink reference signals (DL-RS). The downlink-RS may include a cell-specific reference signal (CRS) and a UE-specific reference signal. UE-RS may be transmitted on the resource blocks associated with PDSCH. The number of bits carried by each resource element may depend on the modulation scheme (the configuration of symbols that may be selected during each symbol period). Thus, the more resource blocks that a UE 115 receives and the higher the modulation scheme, the higher the data rate may be for the UE 115. The payload of data transmitted over a physical layer (e.g., via PDSCH and PUSCH) may be included in one or more TBs. In some cases, a TB may be associated with a codeword, and may sometimes be referred to as a codeword. TBs may have varying sizes based on one or more parameters, such as the number of resource blocks and a modulation and coding scheme (MCS).

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may support one or more feedback schemes. For example, wireless communications system 100 may support codebook-based HARQ feedback (e.g., using a Type 2 HARQ-ACK codebook). As such, a UE 115 may transmit a number of information bits within a HARQ-ACK codebook to a base station 105. The UE 115 may also monitor for downlink transmissions (e.g., PDSCH, PDCCH, or both) during one or more monitoring occasions. The UE 115 may indicate, using respective information bits within the HARQ-ACK codebook, whether one or more downlink transmissions corresponding to one or more groups were decoded successfully by the UE 115. For example, the UE 115 may generate a HARQ-ACK codebook including feedback for a first group of downlink transmissions and a second group of downlink transmissions (e.g., for code block group (CBG) based codebooks). Additionally or alternatively, the UE 115 may generate one or more HARQ-ACK codebooks for each group (e.g., a first codebook for a first group and a second codebook for a second group), for example, when the UE 115 implements TB-based codebooks.

However, in some examples, the UE 115 may be unable to accurately implement power control for reporting group-based feedback such as one or more HARQ-ACK codebooks. For example, the UE 115 may be unable to accurately calculate a number of information bits of feedback for different groups of downlink transmissions (e.g., due to separate DAI counting processes associated with each group).

Accordingly, the UE 115 may implement power control techniques as described herein to calculate a number of information bits of a feedback report and identify a transmission power for the feedback report based on the calculated number of information bits. For example, the UE 115 may receive one or more DCI messages corresponding to one or more groups of downlink transmissions (e.g., a first group and a second group). The UE 115 may calculate the number of information bits based on the one or more groups. For example, the UE 115 may determine first feedback of a first group (e.g., feedback bits of a codebook) and second feedback of a second group to include in a feedback message. The UE 115 may calculate a term corresponding to the first group, for example, including a number of information bits associated with DCI messages of the first group that the UE 115 failed to receive or decode, a number of information bits associated with one or more TBs of the first group that the UE 115 received, or both. The UE 115 may similarly calculate a term corresponding to the second group, a term corresponding to a third group, and so on. The UE 115 may calculate a number of information bits based on one or more of the terms associated with each group. Thus, the UE 115 may accurately identify a transmission power for the feedback message that accounts for feedback associated with different groups.

Figure 2:
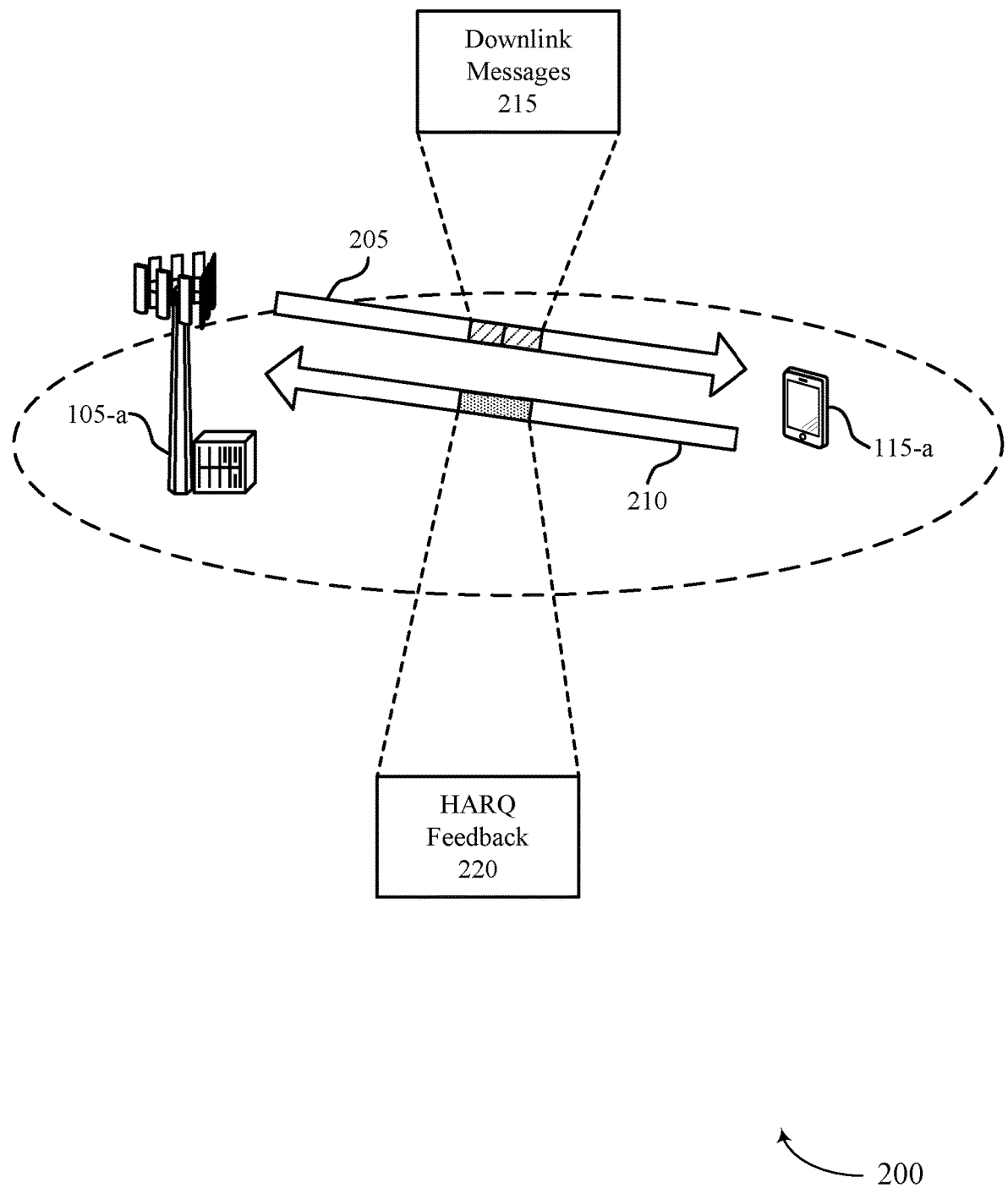
FIG. 2 illustrates an example of a wireless communications system that supports feedback power control techniques for wireless communications systems in accordance with aspects of the present disclosure.

FIG. 2 illustrates an example of a wireless communications system 200 that supports feedback power control techniques for wireless communications systems in accordance with aspects of the present disclosure. In some examples, the wireless communications system 200 may implement aspects of the wireless communications system 100. For example, the wireless communications system 200 includes a UE 115-a and a base station 105-a, which may be examples of the corresponding devices described with reference to FIG. 1. The wireless communications system 200 may implement one or more feedback schemes as described herein, which may enable one or more wireless devices (e.g., the UE 115-a) to identify a transmission power for a feedback message, which may provide reliable communications and reduce power consumption, among other advantages.

In some cases, the UE 115-a and the base station 105-a may communicate using one or more downlink transmissions 205 and feedback transmissions 210. For example, the base station 105-a may send downlink transmissions 205 on a PDSCH. The UE 115-a may receive data transmitted by the base station 105-a and may send feedback transmissions 210. In some cases, the downlink transmissions 205 may include one or more downlink messages 215 and feedback transmissions 210 may include HARQ feedback 220 (e.g., including one or more dynamic HARQ-ACK codebooks).

According to some aspects, the UE 115-a may transmit HARQ feedback 220 to the base station 105-a. For example, the base station 105-a may send data transmissions (e.g., downlink messages 215) to the UE 115-a. The UE 115-a may use HARQ feedback 220 to ensure reception of the transmitted data. For example, the UE 115-a may send HARQ feedback transmissions (e.g., HARQ feedback 220) that includes an ACK or a NACK for one or more of the data transmissions (e.g., one or more PDSCH transmissions or downlink messages 215). In such cases, the UE 115-a may monitor for downlink messages 215 sent by the base station 105-a during one or more monitoring occasions (e.g., time periods during which the UE 115-*a* monitors a set of resources to identify data sent to the UE 115-*a* from the base station 105-*a*).

In some cases, the wireless communications system 200 may use codebook-based HARQ feedback. For example, a HARQ-ACK codebook including multiple HARQ information bits (e.g., ACK/NACK for respective downlink messages 215) may be transmitted simultaneously on a single feedback occasion, where HARQ feedback bits may be encoded in a HARQ-ACK codebook.

In some cases, the UE 115-*a* may transmit different types of HARQ-ACK codebooks. For instance, a semi-static codebook may be used, where a HARQ feedback bit may be reserved in a semi-static codebook of fixed size (e.g., regardless of whether a PDSCH transmission occurs). Additionally or alternatively, a dynamic codebook may be used. In such cases, a HARQ feedback bit may be conditionally added to a feedback message (e.g., a feedback transmission). For example, the HARQ feedback bit may be added or reserved in the dynamic codebook if a downlink message (such as a DCI message or a PDSCH transmission) is detected. Here, the UE 115-*a* may construct a codebook for transmission based on a detection of a PDSCH transmission (e.g., where an information bit may only be included in a HARQ-ACK codebook if a transmission was detected). In some cases, the UE 115-*a* may detect a PDSCH transmission by blind decoding of a PDCCH having a PDSCH allocation. In other cases, the UE 115-*a* may detect a PDCCH releasing a semi-persistently scheduled PDSCH. In such cases, the PDCCH releasing the semi-persistently scheduled PDSCH may not involve the transmission of PDSCH, but the UE 115-*a* may transmit an ACK to confirm detection of the PDCCH. In yet other cases, the UE 115-*a* may detect a PDSCH transmission by detection of a semi-persistent PDSCH. In any case, such dynamic codebooks may reduce a codebook size and may reduce feedback overhead.

In some examples, the UE 115-*a* may implement feedback for one or more groups of downlink transmissions (e.g., downlink messages 215). For example, different PDSCH transmissions may be configured (e.g., by the base station 105-*a*) to be included in different groups. As such, the UE 115-*a* may indicate, using respective information bits within one or more codebooks, whether data transmissions corresponding to one or more groups of data transmissions were received or decoded successfully by the UE 115-*a*. In some examples, the UE 115-*a* may generate a HARQ-ACK codebook corresponding to a first group of downlink messages 215 and a second group of downlink messages 215 (e.g., for CBG based codebooks). Additionally or alternatively, the UE 115-*a* may generate a HARQ-ACK codebook for each group (e.g., a first codebook for a first group and a second codebook for a second group), for example, when the UE 115-*a* is configured with TB-based feedback. In other words, the UE 115-*a* may generate a first codebook including an information bit (e.g., an ACK or a NACK) for each TB of one or more downlink transmissions of the first group. The UE 115-*a* may also generate a second codebook including an information bit for each TB of one or more downlink transmissions of the second group.

However, in some examples, the UE 115-*a* may be unable to accurately implement power control for reporting group-based feedback such as one or more codebooks. For example, the UE 115-*a* may be unable to accurately calculate a number of information bits of feedback for different groups of downlink transmissions (e.g., due to separate DAI counting processes associated with each group).

Accordingly, the UE 115-*a* may implement power control techniques as described herein in order to calculate (e.g., determine) a number of information bits of a feedback report, which may enable the UE 115-*a* to identify a transmission power for the feedback report based on the calculated number of information bits. For example, the UE 115-*a* may receive one or more DCI messages corresponding to one or more groups of downlink messages 215 (e.g., a first group and a second group). The UE 115-*a* may calculate (e.g., determine) the number of information bits (e.g., HARQ-ACK information bits) based on the one or more groups. The UE 115-*a* may determine first feedback of a first group (e.g., feedback bits of a codebook) and second feedback of a second group to include in a feedback message. The UE 115-*a* may calculate a term corresponding to the first group, for example, including a number of information bits associated with DCI messages of the first group that the UE 115-*a* failed to receive, a number of information bits associated with one or more TBs of the first group that the UE 115-*a* received, or both. The UE 115-*a* may similarly calculate a term corresponding to the second group, a term corresponding to a third group, and so on. The UE 115-*a* may calculate a number of information bits based on one or more of the terms associated with each group. Thus, the UE 115-*a* may accurately identify a transmission power for the feedback message (e.g., the HARQ feedback 220).

Figure 3:
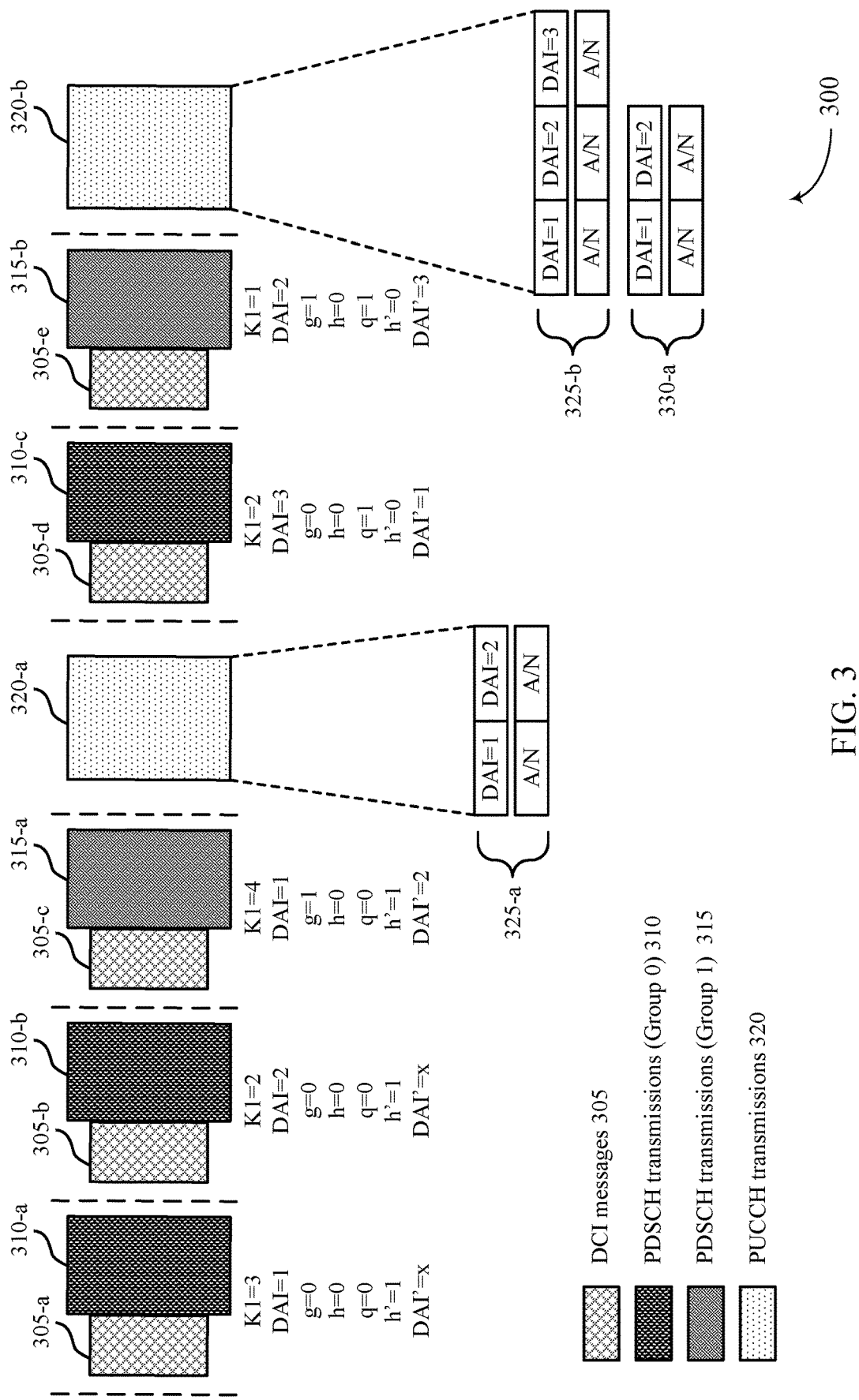
FIG. 3 illustrates an example of a feedback scheme that supports feedback power control techniques for wireless communications systems in accordance with aspects of the present disclosure.

FIG. 3 illustrates an example of a feedback scheme 300 that supports feedback power control techniques for wireless communications systems in accordance with aspects of the present disclosure. In some examples, the feedback scheme 300 may implement aspects of wireless communications systems 100 and 200. For instance, the feedback scheme 300 may illustrate communications between a UE 115 and a base station 105, which may be examples of a UE 115 and base station 105, respectively, described with reference to FIGS. 1 and 2. The feedback scheme 300 may enable a wireless device to implement power control techniques for feedback communications in order to ensure reliable communications and improved power usage in the system.

The feedback scheme 300 may illustrate examples of DCI messages 305. For example, the DCI message 305-*a* may be an example of a transmission from a base station 105 to a UE 115 during a first monitoring occasion (e.g., a slot). In some examples, the DCI message 305-*b* may be an example of a transmission during a second monitoring occasion, or an example of a transmission during the first monitoring occasion (e.g., one or more of the DCI messages 305 may be transmitted during a same PDCCH monitoring occasion, for example, across serving cells or on different component carriers (CCs)). The DCI messages 305 may indicate one or more data transmissions corresponding to a first group (e.g., PDSCH transmissions 310) or one or more data transmissions corresponding to a second group (e.g., PDSCH transmissions 315).

A UE 115 may transmit first feedback 325 and/or second feedback 330 (e.g., information bits in one or more HARQ-ACK codebooks) using a physical uplink control channel (PUCCH) transmission 320. The UE 115 may determine the first feedback 325 or the second feedback 330 based on the DCI messages 305, the PDSCH transmissions 310 of the first group, and the PDSCH transmissions 315 of the second group, or any combination thereof. As an illustrative example, the UE 115 may generate first feedback 325-*a* based on one or more of the DCI messages 305-*a* through 305-*c*, PDSCH transmissions 310-*a* and 310-*b*, and PDSCH transmission 315-*a*. For instance, the UE 115 may receive one or more parameters in a DCI message 305. The one or more parameters may include an indication of the next opportunity (e.g., a subsequent opportunity) for a PUCCH transmission 320. For example, the DCI message 305-a may include a parameter indicating a quantity of monitoring occasions (e.g., slots) between the DCI message 305-a and the PUCCH transmission 320-a (e.g., K1=3 may represent 3 slots between the DCI message 305-a and the PUCCH transmission 320-a).

Additionally or alternatively, the one or more parameters may include one or more DAIs. For example, the DCI message 305-a may correspond to a PDSCH transmission 310-a of a first group of PDSCH transmissions 310. The DCI message 305-a may include a DAI associated with the scheduled group (e.g., the first group of PDSCH transmissions 310). For example, the PDSCH transmission 310-a may be a first transmission in the first group, and the DAI for the first group may be represented as, for example, DAI=1. In some examples, a DCI message 305 may include a DAI of a different group. For example, the DCI message 305-c may correspond to a PDSCH transmission 315-a, which may be a first transmission in a second group of PDSCH transmissions 315. The DCI message 305-c may include an indication of the last transmitted value of the DAI of the non-scheduled group (e.g., first group of PDSCH transmissions 310). For example, the indication of the value of the DAI of the non-scheduled group may be represented by DAI' (e.g., DAI'=2 in the DCI message 305-c). Such an indication of the other group's most recent DAI value may enable a UE 115 to properly construct first feedback 325 as described herein. The UE 115 may receive a PDSCH transmission 310-a of the first group, and the DCI message 305-c may indicate a DAI value of 2 for the first group (e.g., DAI'=2). Thus, the UE 115 may detect a missed DCI message 305-b based on the DCI message 305-c. The UE 115 may generate the first feedback 325-a to include an entry for the missed DCI message 305-b (e.g., a NACK corresponding to DAI=2).

Additionally or alternatively, the one or more parameters may include an indication that a DCI message 305 corresponds to a group. For example, the feedback scheme 300 may include examples of one or more indication fields g. In some examples, a value of g=0 may indicate that the DCI message 305 corresponds to a PDSCH transmission 310 of the first group, and a value of g=1 may indicate that the DCI message 305 corresponds to a PDSCH transmissions 315 of the second group, among other examples of values and indication fields. In some examples, the one or more parameters may include a first new feedback indication (NFI) field corresponding to the first group (e.g., h=0 or h=1) and/or a second NFI field corresponding to the second group (e.g., h'=0 or h'=1). For example, the first NFI field may be toggled by the base station 105 (e.g., from a value of 0 to 1 or vice versa) to indicate to the UE 115 to restart a counter for a DAI for the first group. Additionally or alternatively, the second NFI field may be toggled by the base station 105 (e.g., from a value of 0 to 1 or vice versa) to indicate to the UE 115 to restart a counter for a DAI for the second group.

In some examples, the one or more parameters may include an indication for the UE 115 to report (e.g., generate) first feedback 325, an indication for the UE 115 to report both the first feedback 325 and second feedback 330, or both. For example, a HARQ-ACK information request field may be represented as q in the feedback scheme 300. As illustrated, if the base station 105 indicates a value of q=0 the UE 115 may report the first feedback 325-a for the first group and refrain from reporting second feedback 330 for the second group. Additionally or alternatively, if the base station 105 indicates a value of q=1, the UE 115 may report the first feedback 325 (e.g., the first feedback 325-b) for the first group and the second feedback 330 (e.g., the second feedback 330-a) for the second group. In some examples, the various parameters described in the feedback scheme 300 may be present or absent from the DCI messages 305, for example, based on a configuration from the base station 105 (e.g., a radio resource control (RRC) configuration). In some examples, the RRC configuration may also configure one or more A UE 115 may identify first feedback 325 or second feedback 330 based on the various parameters and communications described herein. For example, the UE 115 may indicate the first feedback 325-a associated with the first group of PDSCH transmissions 310 to the base station 105 via the PUCCH transmission 320-a. In some examples, the UE 115 may refrain from indicating or generating second feedback 330 for reporting via the PUCCH transmissions 320-a, for example, due to an indication for the UE 115 to report only the first feedback 325-a (e.g., represented as q=0 in the feedback scheme 300). In some examples, the first feedback 325-a may be indicated in a codebook. For example, the UE 115 may determine information bits (e.g., feedback bits) for each PDSCH transmission 310. The information bits may indicate an ACK if a PDSCH transmission 310 was successfully decoded, and a NACK if a PDSCH transmissions 310 was not successfully received or decoded. For instance, the UE 115 may successfully decode the PDSCH transmission 310-a and fail to receive the PDSCH transmission 310-b of the first group (e.g., the UE 115 may miss the DCI message 305-b). In such an example, the UE 115 may include an ACK for a first entry of the codebook (e.g., corresponding to a DAI of 1) and a NACK for a second entry of the codebook (e.g., corresponding to a DAI of 2), which may enable a base station 105 to retransmit the DCI message 305-b, the PDSCH transmission 310-b, or both.

As another illustrative example, the UE 115 may identify the first feedback 325-b and the second feedback 330-a for a feedback report. For example, the UE 115 may include the first feedback 325-b and the second feedback 330-a in a same codebook for both groups, or generate a different codebook for each of the first group and the second group. In some examples, the UE 115 may indicate both the first feedback 325-b of the first group and the second feedback 330-a of the second group based on an indication from the base station 105 (e.g., represented as q=1 in the feedback scheme 300). In other examples, the first feedback 325-b of the first group and the second feedback 330-a of the second group may be included in a same feedback message because a previous feedback message (e.g., sent via PUCCH transmission 320-a) was not received by the base station 105. Other scenarios may be possible that may result in both the first feedback 325-b of the first group and the second feedback 330-a of the second group being reported together in a same feedback message.

The UE 115 may determine information bits to include in the first feedback 325-a and the second feedback 330-a as described herein. The UE 115 may indicate the feedback report to the base station 105 via the PUCCH transmission 320-b. In some examples, the UE 115 may include one information bit per PDSCH transmission (e.g., one ACK/NACK for each DAI), for example, due to a configuration from the base station 105 indicating a threshold number of TB per PDSCH transmission as one. In some other examples, the UE 115 may report multiple information bits per PDSCH transmission, as described with reference to FIG. 4.

The UE 115 may identify a transmission power for a PUCCH transmissions 320 based on a number of information bits of a feedback report. In some examples, the UE 115 may be configured to calculate the number of information bits as represented by Equation 1:

$$n_{HARQ-ACK} = n_{HARQ-ACK,TB} = ((V_{DAI,m_{last}}^{DL} - \Sigma_{c=0}^{N_{cells}^{DL}-1} U_{DAI,c}) \mod 4) N_{TB,max}^{DL} + \Sigma_{c=0}^{N_{cells}^{DL}-1} (\Sigma_{m=0}^{M-1} N_{m,c}^{received} + N_{SPS,c}) \quad (1)$$

In Equation 1, the $n_{HARQ-ACK}$ may represent the number of information bits for a HARQ feedback report. The $n_{HARQ-ACK,TB}$ may represent the number of information bits corresponding to a total number of TBs transmitted to the UE 115. The first term of Equation 1 may represent the number of information bits (e.g., NACKs) that the UE 115 may generate in the codebook due to missing DCI messages 305. In the first term, the $V_{DAI,m_{last}}^{DL}$ may represent the value of total DAI (if any) in the last PDCCH monitoring occasion (e.g., the last occasion the UE 115 monitors for a DCI message 305) or the value of a last counter DAI in the last PDCCH monitoring occasion. The $\Sigma_{c=0}^{N_{cells}^{DL}-1} U_{DAI,c}$ may represent the total number of DCI messages 305 (e.g., DCI formats scheduling PDSCH transmissions or indicating SPS PDSCH release) that the UE 115 detects within an M quantity of PDCCH monitoring occasions for a serving cell c. The $N_{TB,max}^{DL}$ may represent the predetermined threshold (e.g., maximum) number of TBs per downlink data transmission (e.g., one in the feedback scheme 300, two in the feedback scheme 400 as described with reference to FIG. 4, or any other threshold number of TBs). The second term of Equation 1, $\Sigma_{c=0}^{N_{cells}^{DL}-1} (\Sigma_{m=0}^{M-1} N_{m,c}^{received} + N_{SPS,c})$, may represent the number of information bits (e.g., ACKs or NACKs) that the UE 115 may generate in the codebook based on decoding results of a number of PDSCH transmissions (e.g., a number of received TBs).

As an illustrative example of implementing Equation 1, a base station 105 may transmit five DCI messages 305 to the UE 115, each including an associated DAI field (e.g., a DAI of 1 for a first data transmission scheduled by a first DCI message 305, a DAI of 2 for a second data transmission scheduled by a second DCI message 305, etc.). In some examples, the UE 115 may be configured with a threshold quantity of TBs per data transmission (e.g., a maximum number of code words scheduled by DCI). For example, the UE 115 may be configured with two maximum TBs per data transmission. The UE 115 may construct a codebook in accordance with the various parameters and techniques described herein. For example, the UE 115 may construct a codebook illustrated with reference to Table 1:

TABLE 1

| UE Codebook | | | | | |
|---|---|---|---|---|---|
| Codebook result per TB | (A/N, A/N) | (A/N, N) | (A/N, N) | (N, N) | (A/N, A/N) |
| Counter DAI Value | 1 | 2 | 3 | 4 | 5 |

In Table 1, a field of A/N may represent a PDSCH decoding result (e.g., an ACK for a successful decoding result and a NACK for a failed decoding result). Table 1 may also include N results, which may represent a NACK. In some examples, an N may represent a "dummy" NACK. For example, due to the threshold quantity of TBs being two, the UE 115 may include one or more dummy NACKS in the codebook in order to ensure a consistent codebook size (e.g., such that the base station 105 may correctly decode the codebook). In the example of Table 1, the N corresponding to the counter DAI 2 and the N corresponding to DAI 3 may illustrate dummy NACKs (e.g., the DCI messages 305 corresponding to the counter DAIS 2 and 3 may schedule a single TB rather than two TBs, and the UE 115 may include the dummy NACKS to achieve a consistent codebook size). Table 1 may also illustrate examples of one or more NACKs indicating that the UE 115 failed to receive a corresponding DCI (e.g., the N,N field may indicate that the UE 115 failed to receive the DCI message 305 corresponding to the counter DAI=4). In some examples illustrated by Table 1, the UE 115 may calculate a number of information bits to determine a transmission power for indicating the UE 115 codebook to a base station 105. For example, the UE 115 may calculate the various terms of Equation 1, as shown in Equation 2:

$$n_{HARQ-ACK} = (5-4)*2+6 = 8 \quad (2)$$

In Equation 2, the calculated number of information bits may be 8 as a result of the various operations and factors in Equation 1. For example, the number of NACK feedback bits generated by the UE 115 in the codebook due to missing DCIS (e.g., a DCI corresponding to the counter DAI value of 4) may be a difference between a last counter DAI value (e.g., 5) and a number of detected DCI messages 305 (e.g., 4), multiplied by the predetermined threshold number of TBs per DCI (e.g., a maximum of 2 TBs per PDSCH transmission scheduled by a DCI). The number of TBs received by the UE 115 may be represented by the 6. Thus, the total number of information bits, excluding the number of dummy NACKs (e.g., the two dummy NACKs in Table 1), may be equal to 8. In some examples, the UE 115 may use a number of information bits to calculate a transmission power for reporting feedback.

However, in some examples, a UE 115 may be unable to implement power control for reporting group-based feedback. For example, a UE 115 may not be configured to calculate a number of information bits when the UE 115 may have to account for different DCI received for different groups. For example, Equation 1 may be unable to accurately calculate a number of information bits when the UE 115 transmits a feedback report indicating first feedback 325 for a first group and second feedback 330 for a second group, due to dynamically changing parameters such as DAIs for multiple groups, NFIs for multiple groups, information request fields, among other examples.

Accordingly, the UE 115 may implement power control techniques as described herein (e.g., Equation 3 as described with reference to FIG. 4). Such techniques may enable the UE 115 to calculate a number of information bits of feedback across different groups of downlink transmissions. For example, the UE 115 may calculate a term corresponding to each of one or more groups (e.g., a term for the first group of PDSCH transmissions 310, a term for the second group of PDSCH transmissions 315, etc.). Thus, the UE 115 may accurately identify a transmission power for a PUCCH transmission 320.

Figure 4:
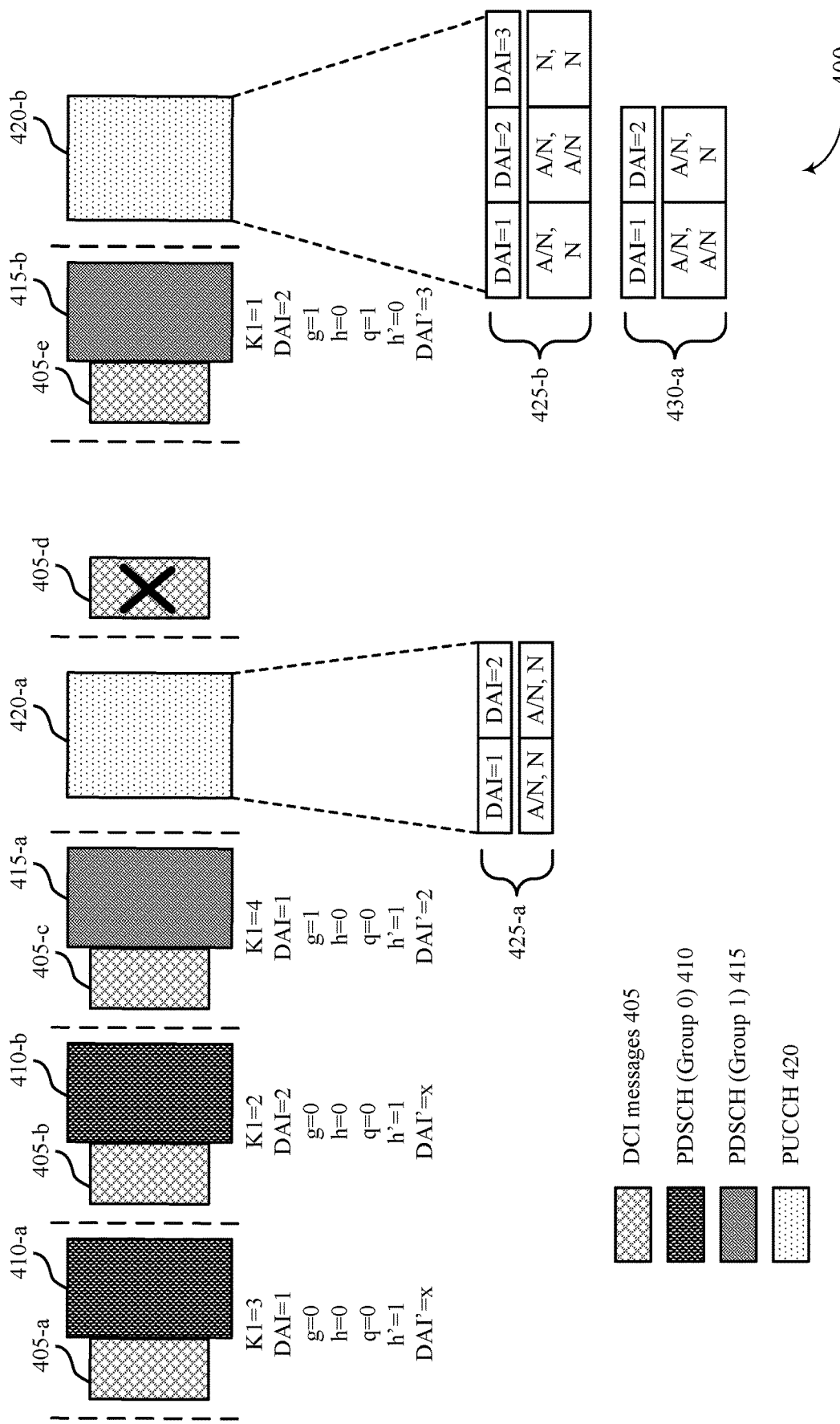
FIG. 4 illustrates an example of a feedback scheme that supports feedback power control techniques for wireless communications systems in accordance with aspects of the present disclosure.

FIG. 4 illustrates an example of a feedback scheme 400 that supports feedback power control techniques for wireless communications systems in accordance with aspects of the present disclosure. In some examples, the feedback scheme 400 may implement aspects of wireless communications systems 100 and 200. For instance, the feedback scheme 400 may illustrate communications between a UE 115 and a base station 105, which may be examples of a UE 115 and base station 105, respectively, described with reference to FIGS. 1 and 2. Generally, the feedback scheme 400 may enable a wireless device to implement power control techniques for feedback communications in order to ensure reliable communications and improved power usage in the system.

In some examples, the feedback scheme 400 may implement aspects of the feedback scheme 300. For example, the feedback scheme 400 may include DCI messages 405, PDSCH transmissions 410 and 415, PUCCH transmissions 420, feedback 425 and 430, and one or more parameters of the DCI messages 405, which may be examples of the corresponding communications and parameters as described with reference to FIG. 3. As an illustrative example, the first feedback 425 may include information bits (e.g., feedback bits of a codebook) for PDSCH transmissions 410 of a first group and the second feedback 430 may include information bits for PDSCH transmission 415 of a second group.

According to the techniques described herein, a UE 115 may calculate a number of information bits of a feedback message (e.g., feedback such as one or more codebooks transmitted via a PUCCH transmission 420). The UE 115 may identify a transmission power for a PUCCH transmission 420 based on the calculated number of information bits. For example, the UE 115 may transmit uplink control information (UCI) indicating the feedback for one or more groups with a payload that satisfies a threshold (e.g., a payload that is less than or equal to 11 bits). The UE 115 may calculate the number of information bits for one or more codebooks of the feedback (e.g., the first feedback 425 and/or the second feedback 430) such that the number of information bits accounts for separate DAI counting processes and dynamic parameters across groups of data transmissions.

The UE 115 may calculate the number of information bits (e.g., HARQ-ACK information bits) based on the one or more groups. For example, the UE 115 may calculate a number of information bits for transmitting the first feedback 425-b of the first group and the second feedback 430-a of the second group via the PUCCH transmission 420-b. In some examples, the UE 115 may determine a term corresponding to the first group and a term corresponding to the second group (e.g., the UE 115 may sum the terms of each group to calculate the number of information bits for reporting feedback of both the first group and the second group). In some examples, the terms of each group may not include a quantity of dummy NACKs of a codebook.

In some examples, a term for a group may include two sub-terms. For example, the term for the first group may include a number of feedback bits associated with "missed" DCI messages 405 of the first group (e.g., the NACKs corresponding to the DAI=3 of the first feedback 425-b, which may indicate that the UE 115 failed to receive the DCI message 405-d). In some examples, the number of feedback bits of a codebook due to missed DCI messages 405 may be calculated in accordance with one or more parameters as described herein with reference to FIG. 3. For example, the last value of a total DAI of the first group may be determined from a last DCI message 405 prior to a PUCCH transmission 420. In some examples, the total DAI of the first group (e.g., a scheduled group) may be indicated in a DCI message 405 of the second group (e.g., a non-scheduled group) if the DCI message 405 of the second group occurs after a last DCI message 405 of the first group prior to the PUCCH transmission 420. A difference between the number of detected DCI messages 405 corresponding to the first group and the last value of the total DAI of the first group may be calculated. The difference may be multiplied (e.g., after a modulo operation) by a configured threshold (e.g., maximum) number of TBs per data transmission (e.g., the configured threshold may be two if a maxNrofCodeWordsScheduledByDCI=2 parameter of RRC signaling is indicated for at least one CC). In some examples, the term for the first group may also include a number of feedback bits associated with a number of TBs of the first group received by the UE 115. As another illustrative example, the term for the second group may include a number of feedback bits associated with "missed" DCI messages 405 of the second group and a number of feedback bits associated with a number of TBs of the second group received by the UE 115.

In some examples, the UE 115 may identify a last DCI message 405 may be identified in accordance with a DCI ordering scheme. For example, the UE 115 may detect a set of DCI formats that schedule PDSCH reception (e.g., PDSCH transmissions 410 for the first group and/or PDSCH transmission 415 for the second group) and that the UE 115 is configured to transmit HARQ-ACK information in a PUCCH transmission 420. The detected DCI formats may be indexed in an ascending order across serving cell indices for a same PDCCH monitoring occasion. Additionally or alternatively, the detected DCI formats may be indexed in an ascending order across PDCCH monitoring occasion indices. In such examples, for a given group, the value of the total DAI may be updated based on the last DCI of the other group, for example, if the last DCI of the other group is after the last DCI of the given group and the last DCI of the other group includes a total DAI field for the given group (e.g., a DAI' field as described with reference to FIG. 3).

Equation 3 may illustrate an example of an equation for calculating (e.g., determining) a number of information bits that accounts for one or more groups, as shown below:

$$n_{HARQ\text{-}ACK} = n_{HARQ\text{-}ACK,TB} = \Sigma_{g=0}^{1}((V_{DAI,m_{last}}^{DL}(g) - \Sigma_{c=0}^{N_{cells}^{DL}-1}U_{DAI,c}(g))\mathrm{mod}(T_D))N_{TB,max}^{DL} + \Sigma_{c=0}^{N_{cells}^{DL}-1}(\Sigma_{g=0}^{1}\Sigma_{m(g)=0}^{M(g)-1}N_{m(g),c}^{received} + N_{SPS,c}) \quad (3)$$

In Equation 3, the $n_{HARQ\text{-}ACK}$ may represent the number of information bits for a HARQ feedback report. The $n_{HARQ\text{-}ACK,TB}$ may represent the number of information bits corresponding to a total number of TBs transmitted to the UE 115. The first term of Equation 3 may represent the number of information bits (e.g., NACKs) that the UE 115 may generate per group due to missing DCI messages 405. In the first term, the $V_{DAI,m_{last}}^{DL}(g)$ may represent the value of total DAI (if any) in the last PDCCH monitoring occasion (e.g., the last occasion the UE 115 monitors for a DCI message 405) or the value of a last counter DAI in the last PDCCH monitoring occasion for a given group. The $\Sigma_{c=0}^{N_{cells}^{DL}-1}U_{DAI,c}(g)$ may represent the total number of DCI messages 405 (e.g., DCI formats scheduling PDSCH transmissions or indicating SPS PDSCH release) that the UE 115 detects within an M quantity of PDCCH monitoring occasions for a serving cell c for a given group. The $\mathrm{mod}(T_D)$ may represent a modulo function. The $N_{TB,max}^{DL}$ may represent the predetermined threshold (e.g., maximum) number of TBs per downlink data transmission for the given group (e.g., two).

The second term of Equation 3, $\Sigma_{c=0}^{N_{cells}^{DL}-1}(\Sigma_{g=0}^{1}\Sigma_{m(g)=0}^{(g)-1}N_{m(g),c}^{received} + N_{SPS,c})$, may represent the number of information bits (e.g., ACKs or NACKs) that the UE 115 may generate in the codebook based on decoding results of a number of PDSCH transmissions (e.g., a number of received TBs) for a given group.

As an illustrative example of reporting the first feedback 425-b and second feedback 430-a in the PUCCH transmission 420-b, the UE 115 may calculate the various terms of Equation 3 as shown in Equation 4:

$$n_{HARQ-ACK}=[(3-2)*2+3]+[(2-2)*2+3]=8 \quad (4)$$

In Equation 4, the calculated number of information bits may be 8 as a result of the various operations and factors in Equation 3. For example, the number of NACK feedback bits generated by the UE 115 in the codebook due to missing DCI message 405-d for the first group may be a difference between a last counter DAI value of the first group (e.g., 3) and a number of detected DCI messages 305 of the first group (e.g., 2), multiplied by the predetermined threshold number of TBs per DCI (e.g., a maximum of 2 TBs per PDSCH transmission scheduled by a DCI), for example, after a modulo function. The number of TBs received by the UE 115 for the first group may be 3. The UE 115 may calculate such factors with reference to the second group, and sum the terms of the first group and the second group for a result of 8 total information bits (e.g., excluding the number of dummy NACKs, such as the N corresponding to the DAI=1 entry of the first feedback 425-b and the N corresponding to the DAI=2 entry of the second feedback 430-a). By calculating a number of information bits that accounts for feedback of both the first group and second group, the UE 115 may accurately determine a transmission power for the PUCCH transmissions 420-b.

Figure 5:
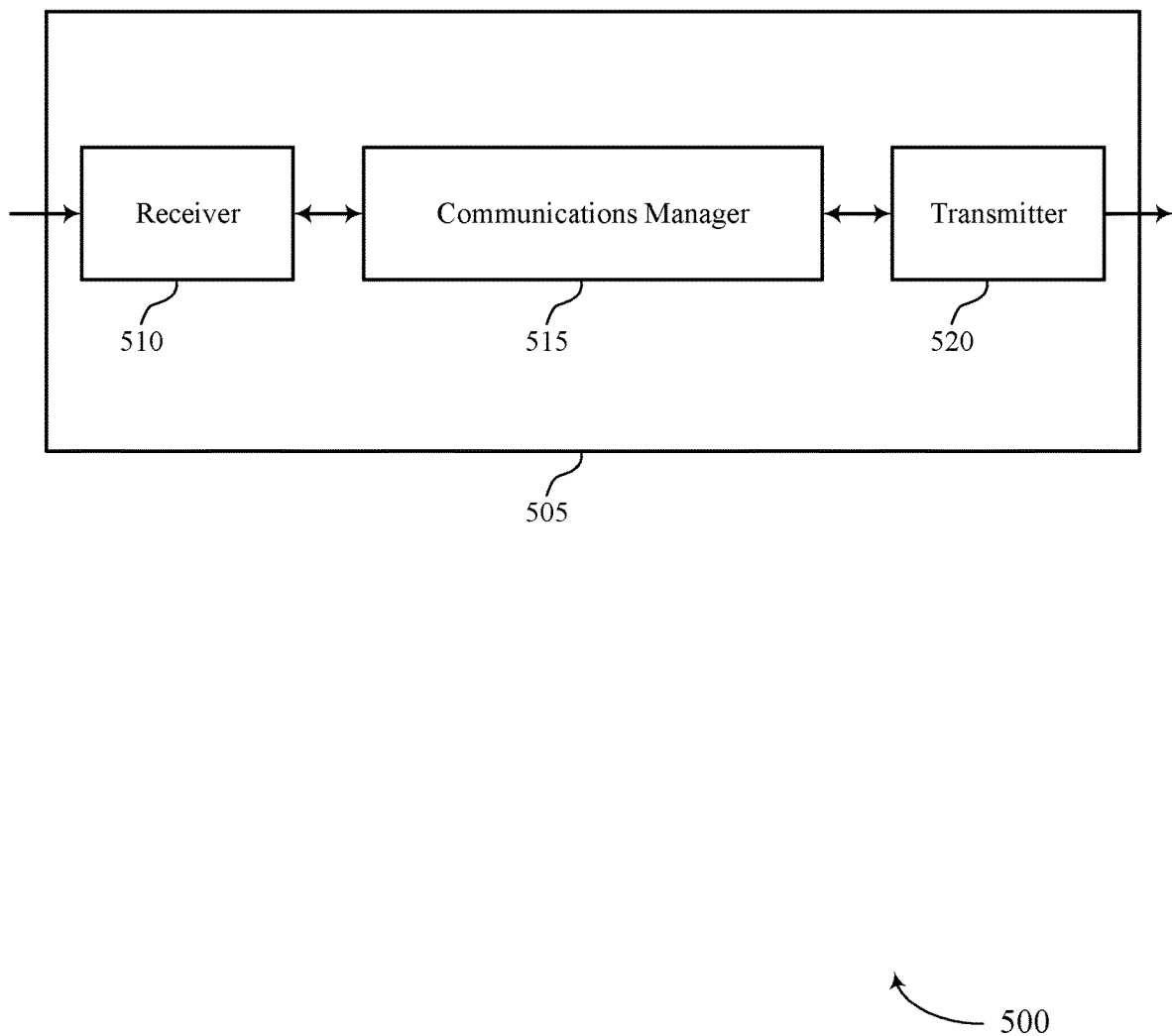
FIGS. 5 and 6 show block diagrams of devices that support feedback power control techniques for wireless communications systems in accordance with aspects of the present disclosure.

FIG. 5 shows a block diagram 500 of a device 505 that supports feedback power control techniques for wireless communications systems in accordance with aspects of the present disclosure. The device 505 may be an example of aspects of a UE 115 as described herein. The device 505 may include a receiver 510, a communications manager 515, and a transmitter 520. The device 505 may also include one or more processors, memory coupled with the one or more processors, and instructions stored in the memory that are executable by the one or more processors to enable the one or more processors to perform the power control features discussed herein. Each of these components may be in communication with one another (e.g., via one or more buses).

The receiver 510 may receive information such as packets, user data, or control information associated with various information channels (e.g., control channels, data channels, and information related to feedback power control techniques for wireless communications systems, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive first downlink control information corresponding to a first group of downlink transmissions and second downlink control information corresponding to a second group of downlink transmissions, calculate a number of information bits for a feedback message including first feedback for one or more downlink transmissions of the first group and second feedback for one or more downlink transmissions of the second group, the number of information bits including first information bits of the first feedback and second information bits of the second feedback, identify a transmission power for the feedback message based on the calculated number of information bits, and transmit the feedback message including the first feedback and the second feedback using the identified transmission power. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
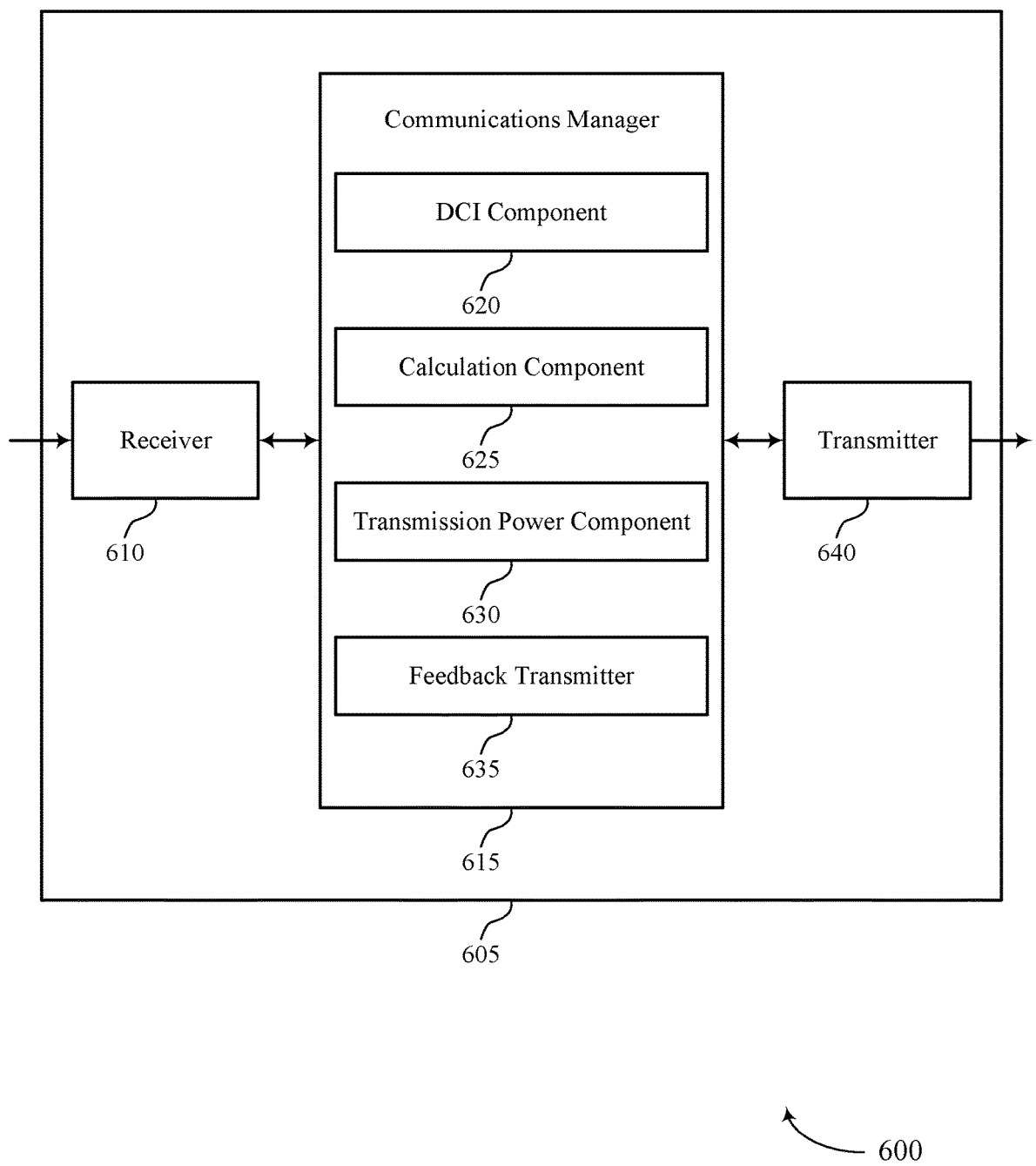

FIG. 6 shows a block diagram 600 of a device 605 that supports feedback power control techniques for wireless communications systems in accordance with aspects of the present disclosure. The device 605 may be an example of aspects of a device 505, or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to feedback power control techniques for wireless communications systems, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a DCI component 620, a calculation component 625, a transmission power component 630, and a feedback transmitter 635. The communications manager 615 may be an example of aspects of the communications manager 810 described herein.

The DCI component 620 may receive first downlink control information corresponding to a first group of downlink transmissions and second downlink control information corresponding to a second group of downlink transmissions.

The calculation component 625 may calculate a number of information bits for a feedback message including first feedback for one or more downlink transmissions of the first group and second feedback for one or more downlink transmissions of the second group, the number of information bits including first information bits of the first feedback and second information bits of the second feedback.

The transmission power component 630 may identify a transmission power for the feedback message based on the calculated number of information bits.

The feedback transmitter 635 may transmit the feedback message including the first feedback and the second feedback using the identified transmission power.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

In some cases, the DCI component 620, the calculation component 625, the transmission power component 630, and the feedback transmitter 635 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the DCI component 620, the calculation component 625, the transmission power component 630, and the feedback transmitter 635 as discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 7:
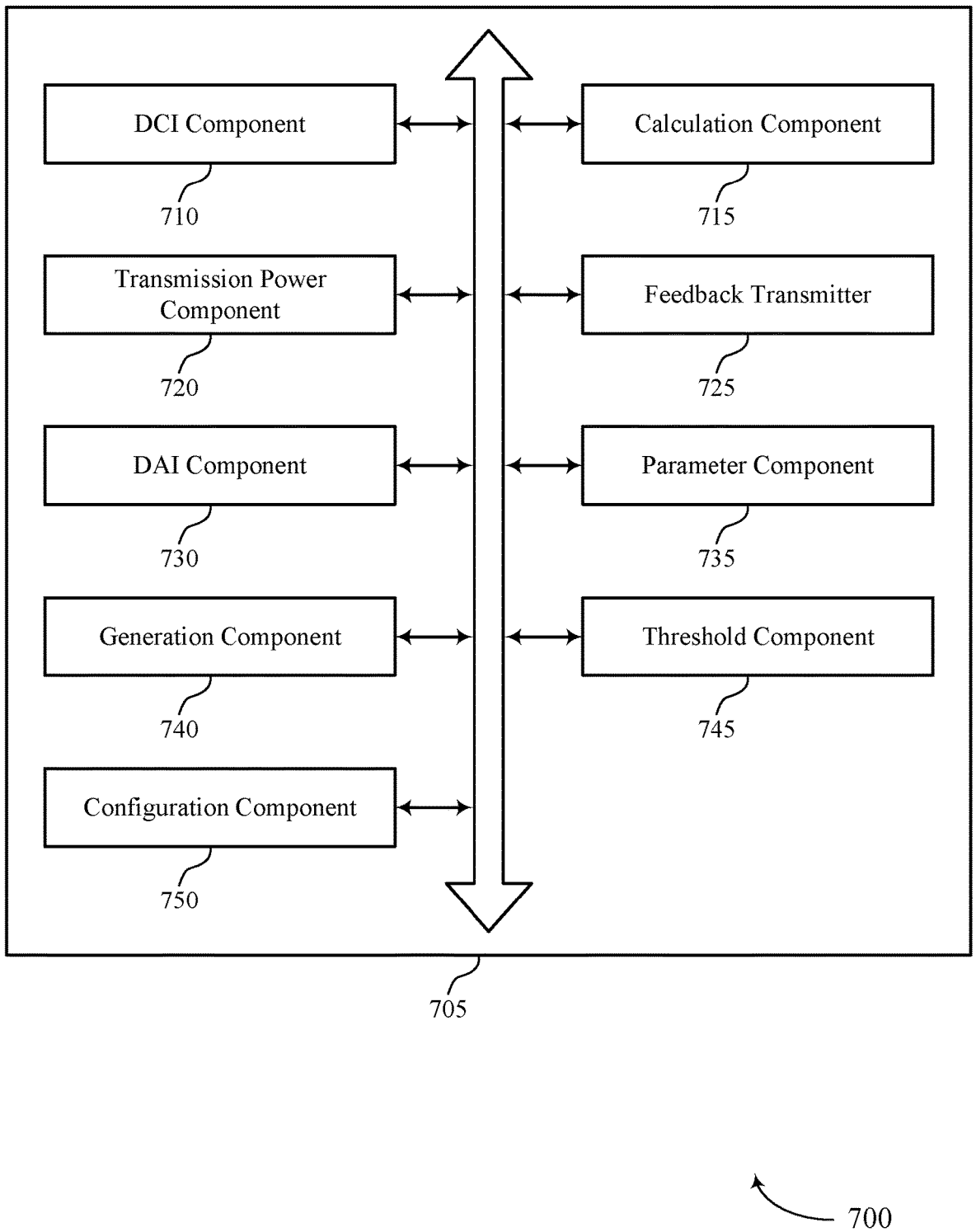
FIG. 7 shows a block diagram of a communications manager that supports feedback power control techniques for wireless communications systems in accordance with aspects of the present disclosure.

FIG. 7 shows a block diagram 700 of a communications manager 705 that supports feedback power control techniques for wireless communications systems in accordance with aspects of the present disclosure. The communications manager 705 may be an example of aspects of a communications manager 515, a communications manager 615, or a communications manager 810 described herein. The communications manager 705 may include a DCI component 710, a calculation component 715, a transmission power component 720, a feedback transmitter 725, a DAI component 730, a parameter component 735, a generation component 740, a threshold component 745, and a configuration component 750. Each of these modules may communicate, directly or indirectly, with one another (e.g., via one or more buses).

The DCI component 710 may receive first downlink control information corresponding to a first group of downlink transmissions and second downlink control information corresponding to a second group of downlink transmissions.

In some examples, the DCI component 710 may receive third downlink control information corresponding to the first group and fourth downlink control information corresponding to the second group, the third downlink control information being a last downlink control information message prior to transmitting the feedback message and received after the fourth downlink control information.

In some examples, the DCI component 710 may receive third downlink control information corresponding to the first group and fourth downlink control information corresponding to the second group, the fourth downlink control information being a last downlink control information message prior to transmitting the feedback message and received after the third downlink control information.

The calculation component 715 may calculate a number of information bits for a feedback message including first feedback for one or more downlink transmissions of the first group and second feedback for one or more downlink transmissions of the second group, the number of information bits including first information bits of the first feedback and second information bits of the second feedback. In some examples, calculating the number of information bits for the feedback message includes calculating the first information bits of the first feedback, where the first information bits of the first feedback includes one or more feedback bits corresponding to downlink control information for the first group that the UE failed to receive and one or more feedback bits corresponding to a quantity of transport blocks of the first group received by the UE.

In some examples, the calculation component 715 may calculate a difference between the value of the downlink assignment index and a number of downlink control information messages associated with the first group received by the UE, where calculating the first information bits of the first feedback is based on the calculated difference.

In some examples, the calculation component 715 may multiply the calculated difference by a predetermined threshold number of transport blocks per downlink shared channel. In some examples, calculating the number of information bits for the feedback message includes calculating the second information bits of the second feedback, where the second information bits of the second feedback includes one or more feedback bits corresponding to downlink control information for the second group that the UE failed to receive and one or more feedback bits corresponding to a quantity of transport blocks of the second group received by the UE.

In some examples, the calculation component 715 may calculate a difference between the value of the downlink assignment index and a number of downlink control information messages associated with the second group received by the UE, where calculating the second information bits of the second feedback is based on the calculated difference. In some cases, an information bit of the number of information bits indicates an acknowledgment or a negative acknowledgment. The transmission power component 720 may identify a transmission power for the feedback message based on the calculated number of information bits.

The feedback transmitter 725 may transmit the feedback message including the first feedback and the second feedback using the identified transmission power. In some cases, the feedback message is transmitted via uplink control information of a physical uplink control channel. In some cases, a payload of the uplink control information is less than or equal to 11 bits.

The DAI component 730 may identify a value of a downlink assignment index of the third downlink control information, the value of the downlink assignment index indicating a total number of downlink control information messages of the first group transmitted to the UE from a base station 105. In some examples, the DAI component 730 may identify a value of a downlink assignment index of the fourth downlink control information, the value of the downlink assignment index indicating a total number of downlink control information messages of the second group transmitted to the UE from a base station 105.

In some examples, the DAI component 730 may identify a value of a downlink assignment index of the third downlink control information, the value of the downlink assignment index indicating a total number of downlink control information messages of the second group transmitted to the UE from a base station 105.

The parameter component 735 may identify one or more parameters of the first downlink control information, the second downlink control information, or both. In some cases, the one or more parameters of the first downlink control information includes an indication that the first downlink control information corresponds to the first group, a first new feedback indication field corresponding to the first group, a second new feedback indication field corresponding to the second group, an indication for the UE to generate the first feedback, an indication for the UE to generate both the first feedback and the second feedback, a downlink assignment index corresponding to the first group, a downlink assignment index corresponding to the second group, or any combination thereof.

In some cases, the one or more parameters of the second downlink control information includes an indication that the second downlink control information corresponds to the second group, a first new feedback indication field corresponding to the first group, a second new feedback indication field corresponding to the second group, an indication for the UE to generate the second feedback, an indication for the UE to generate both the first feedback and the second feedback, a downlink assignment index corresponding to the first group, a downlink assignment index corresponding to the second group, or any combination thereof.

The generation component 740 may generate the first feedback corresponding to the first group based on the one or more parameters. In some examples, the generation component 740 may generate the second feedback corresponding to the second group based on the one or more parameters. In some examples, generating an information bit for a first transport block scheduled by the first downlink control information, where a first entry of a first codebook corresponds to the first downlink control information and includes the information bit for the first transport block. In some examples, generating an information bit for a second transport block scheduled by the first downlink control information, where the first entry of the first codebook includes the information bit for the second transport block.

In some examples, the generation component 740 may append one or more negative acknowledgment bits to the first entry of the first codebook, where a size of the first entry of the first codebook matches the threshold number of transport blocks. The threshold component 745 may identify a threshold number of transport blocks scheduled by downlink control information.

The configuration component 750 may receive, from a base station, a configuration of an enhanced dynamic codebook for hybrid automatic repeat request feedback, where the feedback message is transmitted in accordance with the configuration.

In some cases, the DCI component 710, the calculation component 715, the transmission power component 720, the feedback transmitter 725, the DAI component 730, the parameter component 735, the generation component 740, the threshold component 745, and the configuration component 750 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the DCI component 710, the calculation component 715, the transmission power component 720, the feedback transmitter 725, the DAI component 730, the parameter component 735, the generation component 740, the threshold component 745, and the configuration component 750 as discussed herein.

Figure 8:
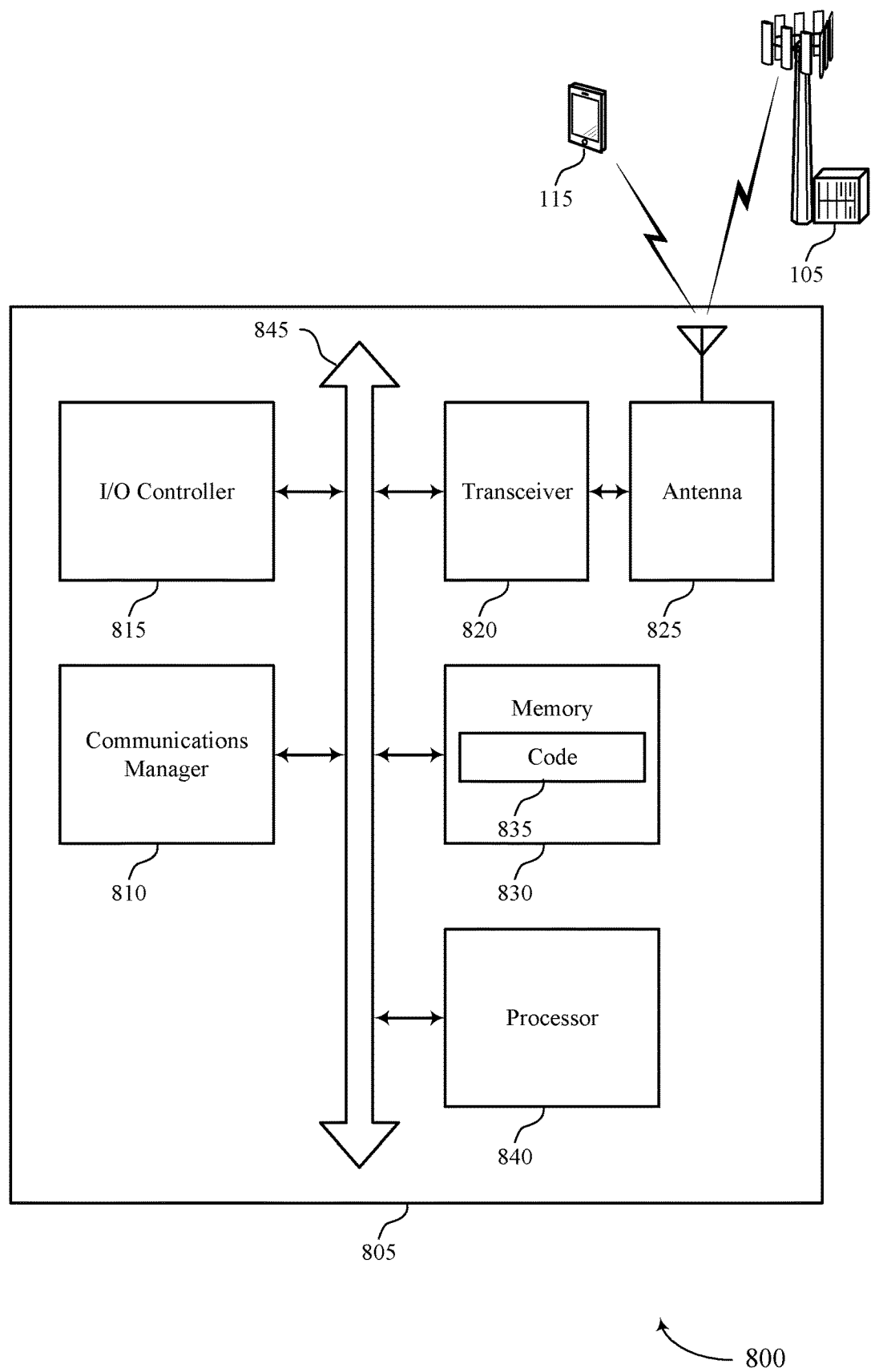
FIG. 8 shows a diagram of a system including a device that supports feedback power control techniques for wireless communications systems in accordance with aspects of the present disclosure.

FIG. 8 shows a diagram of a system 800 including a device 805 that supports feedback power control techniques for wireless communications systems in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive first downlink control information corresponding to a first group of downlink transmissions and second downlink control information corresponding to a second group of downlink transmissions, calculate a number of information bits for a feedback message including first feedback for one or more downlink transmissions of the first group and second feedback for one or more downlink transmissions of the second group, the number of information bits including first information bits of the first feedback and second information bits of the second feedback, identify a transmission power for the feedback message based on the calculated number of information bits, and transmit the feedback message including the first feedback and the second feedback using the identified transmission power.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting feedback power control techniques for wireless communications systems).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
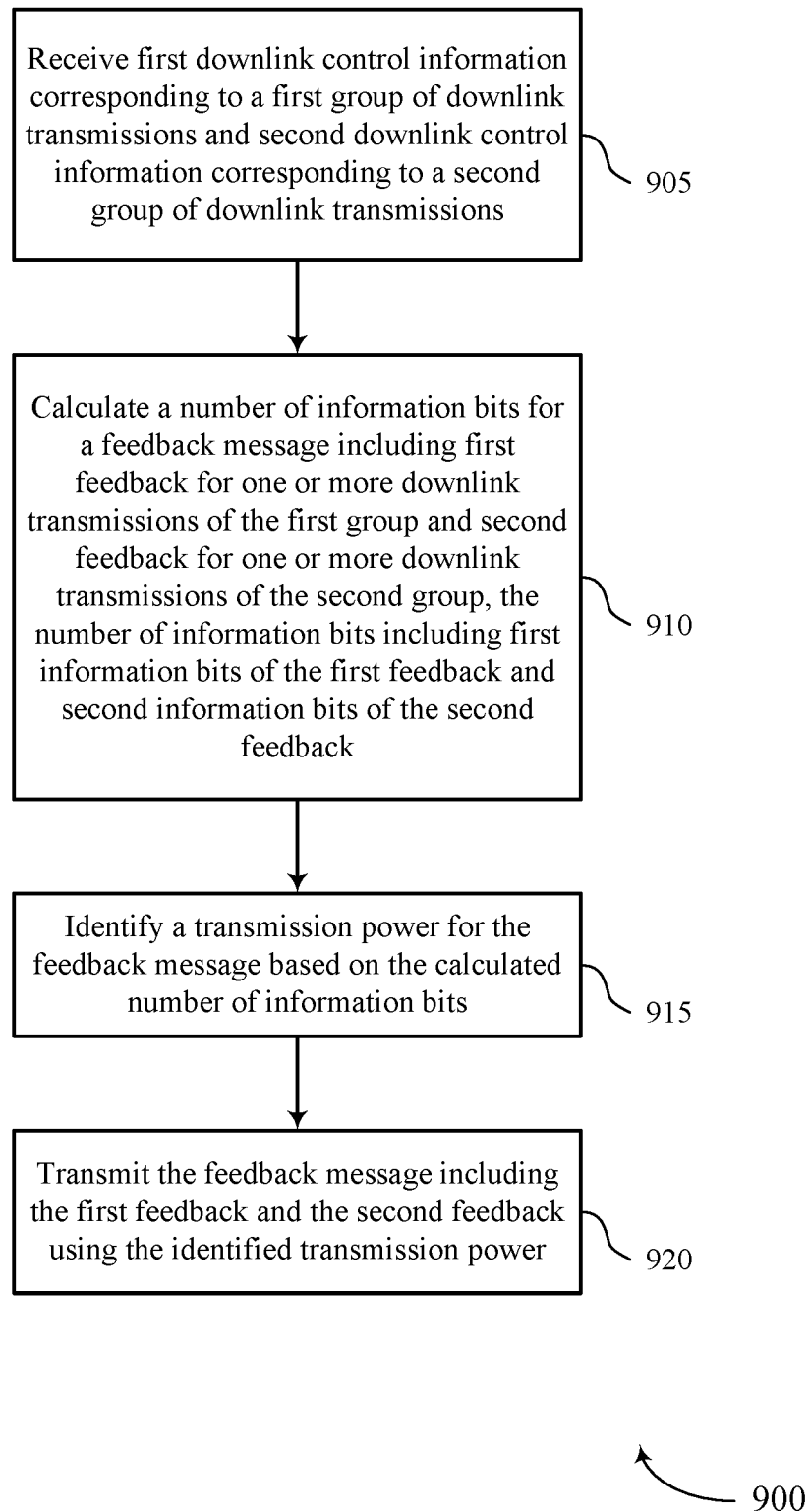
FIGS. 9 and 10 show flowcharts illustrating methods that support feedback power control techniques for wireless communications systems in accordance with aspects of the present disclosure.

FIG. 9 shows a flowchart illustrating a method 900 that supports feedback power control techniques for wireless communications systems in accordance with aspects of the present disclosure. The operations of method 900 may be implemented by a UE 115 or its components as described herein. For example, the operations of method 900 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 905, the UE may receive first downlink control information corresponding to a first group of downlink transmissions and second downlink control information corresponding to a second group of downlink transmissions. The operations of 905 may be performed according to the methods described herein. In some examples, aspects of the operations of 905 may be performed by a DCI component as described with reference to FIGS. 5 through 8.

At 910, the UE may calculate a number of information bits for a feedback message including first feedback for one or more downlink transmissions of the first group and second feedback for one or more downlink transmissions of the second group, the number of information bits including first information bits of the first feedback and second information bits of the second feedback. The operations of 910 may be performed according to the methods described herein. In some examples, aspects of the operations of 910 may be performed by a calculation component as described with reference to FIGS. 5 through 8.

At 915, the UE may identify a transmission power for the feedback message based on the calculated number of information bits. The operations of 915 may be performed according to the methods described herein. In some examples, aspects of the operations of 915 may be performed by a transmission power component as described with reference to FIGS. 5 through 8.

At 920, the UE may transmit the feedback message including the first feedback and the second feedback using the identified transmission power. The operations of 920 may be performed according to the methods described herein. In some examples, aspects of the operations of 920 may be performed by a feedback transmitter as described with reference to FIGS. 5 through 8.

Figure 10:
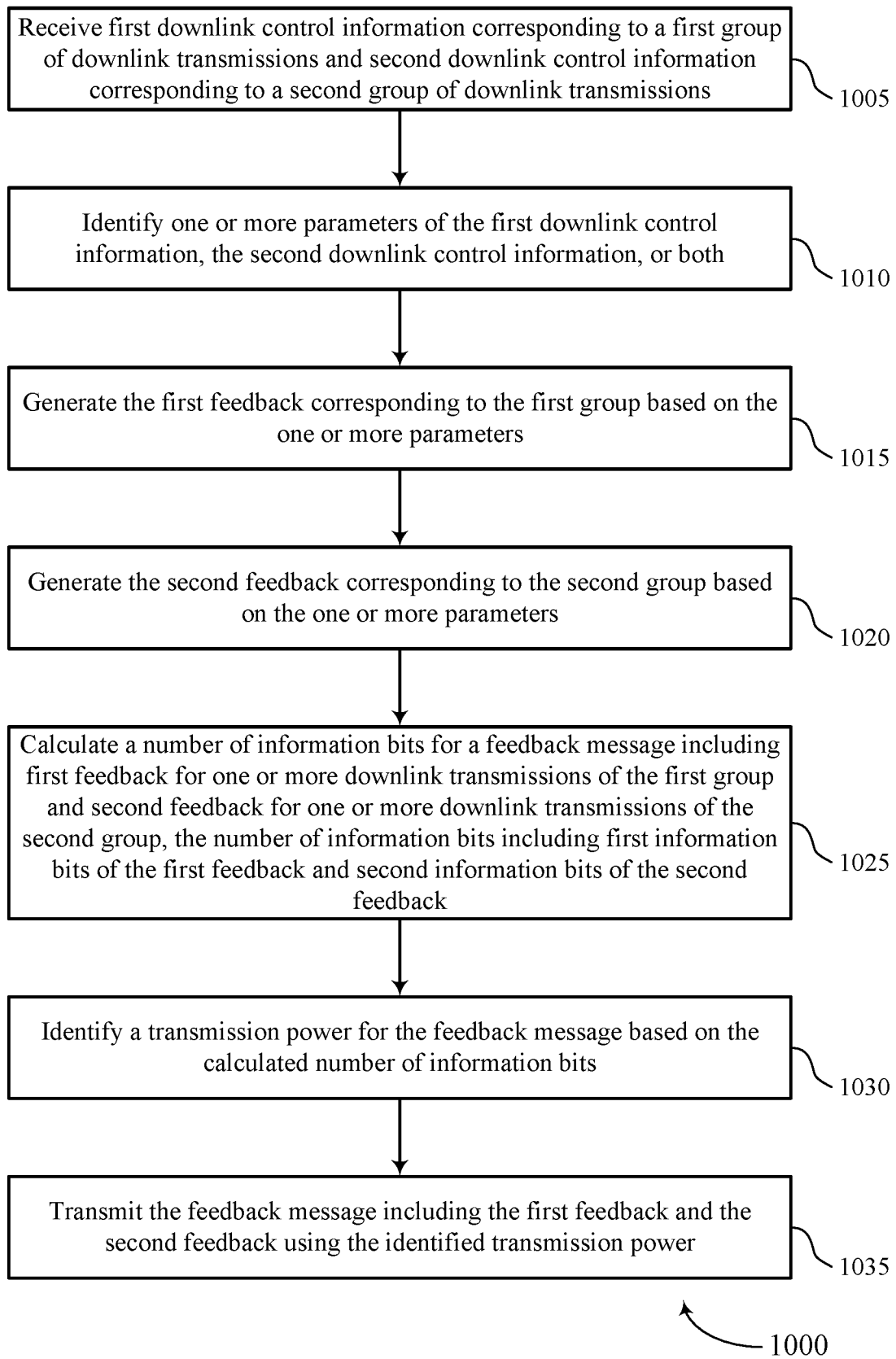

FIG. 10 shows a flowchart illustrating a method 1000 that supports feedback power control techniques for wireless communications systems in accordance with aspects of the present disclosure. The operations of method 1000 may be implemented by a UE 115 or its components as described herein. For example, the operations of method 1000 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1005, the UE may receive first downlink control information corresponding to a first group of downlink transmissions and second downlink control information corresponding to a second group of downlink transmissions. The operations of 1005 may be performed according to the methods described herein. In some examples, aspects of the operations of 1005 may be performed by a DCI component as described with reference to FIGS. 5 through 8.

At 1010, the UE may identify one or more parameters of the first downlink control information, the second downlink control information, or both. The operations of 1010 may be performed according to the methods described herein. In some examples, aspects of the operations of 1010 may be performed by a parameter component as described with reference to FIGS. 5 through 8.

At 1015, the UE may generate the first feedback corresponding to the first group based on the one or more parameters. The operations of 1015 may be performed according to the methods described herein. In some examples, aspects of the operations of 1015 may be performed by a generation component as described with reference to FIGS. 5 through 8.

At 1020, the UE may generate the second feedback corresponding to the second group based on the one or more parameters. The operations of 1020 may be performed according to the methods described herein. In some examples, aspects of the operations of 1020 may be performed by a generation component as described with reference to FIGS. 5 through 8.

At 1025, the UE may calculate a number of information bits for a feedback message including first feedback for one or more downlink transmissions of the first group and second feedback for one or more downlink transmissions of the second group, the number of information bits including first information bits of the first feedback and second information bits of the second feedback. The operations of 1025 may be performed according to the methods described herein. In some examples, aspects of the operations of 1025 may be performed by a calculation component as described with reference to FIGS. 5 through 8.

At 1030, the UE may identify a transmission power for the feedback message based on the calculated number of information bits. The operations of 1030 may be performed according to the methods described herein. In some examples, aspects of the operations of 1030 may be performed by a transmission power component as described with reference to FIGS. 5 through 8.

At 1035, the UE may transmit the feedback message including the first feedback and the second feedback using the identified transmission power. The operations of 1035 may be performed according to the methods described herein. In some examples, aspects of the operations of 1035 may be performed by a feedback transmitter as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a UE, comprising: receiving first downlink control information corresponding to a first group of downlink transmissions and second downlink control information corresponding to a second group of downlink transmissions; calculating a number of information bits for a feedback message comprising first feedback for one or more downlink transmissions of the first group and second feedback for one or more downlink transmissions of the second group, the number of information bits comprising first information bits of the first feedback and second information bits of the second feedback; identifying a transmission power for the feedback message based at least in part on the calculated number of information bits; and transmitting the feedback message comprising the first feedback and the second feedback using the identified transmission power.

Aspect 2: The method of aspect 1, wherein calculating the number of information bits for the feedback message comprises: calculating the first information bits of the first feedback, wherein the first information bits of the first feedback comprises one or more feedback bits corresponding to downlink control information for the first group that the UE failed to receive and one or more feedback bits corresponding to a quantity of transport blocks of the first group received by the UE.

Aspect 3: The method of aspect 2, further comprising: receiving third downlink control information corresponding to the first group and fourth downlink control information corresponding to the second group, the third downlink control information being a last downlink control information message prior to transmitting the feedback message and received after the fourth downlink control information; identifying a value of a downlink assignment index of the third downlink control information, the value of the downlink assignment index indicating a total number of downlink control information messages of the first group transmitted to the UE from a base station; and calculating a difference between the value of the downlink assignment index and a number of downlink control information messages associated with the first group received by the UE, wherein calculating the first information bits of the first feedback is based at least in part on the calculated difference.

Aspect 4: The method of aspect 3, wherein calculating the first information bits of the first feedback comprises: multiplying the calculated difference by a predetermined threshold number of transport blocks per downlink shared channel.

Aspect 5: The method of any of aspects 1 through 4, wherein calculating the number of information bits for the feedback message comprises: calculating the second information bits of the second feedback, wherein the second information bits of the second feedback comprises one or more feedback bits corresponding to downlink control information for the second group that the UE failed to receive and one or more feedback bits corresponding to a quantity of transport blocks of the second group received by the UE.

Aspect 6: The method of aspect 5, further comprising: receiving third downlink control information corresponding to the first group and fourth downlink control information corresponding to the second group, the fourth downlink control information being a last downlink control information message prior to transmitting the feedback message and received after the third downlink control information; identifying a value of a downlink assignment index of the fourth downlink control information, the value of the downlink assignment index indicating a total number of downlink control information messages of the second group transmitted to the UE from a base station; and calculating a difference between the value of the downlink assignment index and a number of downlink control information messages associated with the second group received by the UE, wherein calculating the second information bits of the second feedback is based at least in part on the calculated difference.

Aspect 7: The method of aspect 6, wherein calculating the second information bits of the second feedback comprises: multiplying the calculated difference by a predetermined threshold number of transport blocks per downlink shared channel.

Aspect 8: The method of any of aspects 5 through 7, further comprising: receiving third downlink control information corresponding to the first group and fourth downlink control information corresponding to the second group, the third downlink control information being a last downlink control information message prior to transmitting the feedback message and received after the fourth downlink control information; identifying a value of a downlink assignment index of the third downlink control information, the value of the downlink assignment index indicating a total number of downlink control information messages of the second group transmitted to the UE from a base station; and calculating a difference between the value of the downlink assignment index and a number of downlink control information messages associated with the second group received by the UE, wherein calculating the second information bits of the second feedback is based at least in part on the calculated difference.

Aspect 9: The method of any of aspects 1 through 8, further comprising: identifying one or more parameters of the first downlink control information, the second downlink control information, or both; generating the first feedback corresponding to the first group based at least in part on the one or more parameters; and generating the second feedback corresponding to the second group based at least in part on the one or more parameters.

Aspect 10: The method of aspect 9, wherein the one or more parameters of the first downlink control information comprises an indication that the first downlink control information corresponds to the first group, a first new feedback indication field corresponding to the first group, a second new feedback indication field corresponding to the second group, an indication for the UE to generate the first feedback, an indication for the UE to generate both the first feedback and the second feedback, a downlink assignment index corresponding to the first group, a downlink assignment index corresponding to the second group, or any combination thereof.

Aspect 11: The method of any of aspects 9 through 10, wherein the one or more parameters of the second downlink control information comprises an indication that the second downlink control information corresponds to the second group, a first new feedback indication field corresponding to the first group, a second new feedback indication field corresponding to the second group, an indication for the UE to generate the second feedback, an indication for the UE to generate both the first feedback and the second feedback, a downlink assignment index corresponding to the first group, a downlink assignment index corresponding to the second group, or any combination thereof.

Aspect 12: The method of any of aspects 9 through 11, wherein generating the first feedback comprises: generating an information bit for a first transport block scheduled by the first downlink control information, wherein a first entry of a first codebook corresponds to the first downlink control information and comprises the information bit for the first transport block.

Aspect 13: The method of aspect 12, further comprising: generating an information bit for a second transport block scheduled by the first downlink control information, wherein the first entry of the first codebook comprises the information bit for the second transport block.

Aspect 14: The method of any of aspects 12 through 13, further comprising: identifying a threshold number of transport blocks scheduled by downlink control information; and appending one or more negative acknowledgment bits to the first entry of the first codebook, wherein a size of the first entry of the first codebook matches the threshold number of transport blocks.

Aspect 15: The method of any of aspects 1 through 14, wherein an information bit of the number of information bits indicates an acknowledgment or a negative acknowledgment.

Aspect 16: The method of any of aspects 1 through 15, further comprising: receiving, from a base station, a configuration of an enhanced dynamic codebook for hybrid automatic repeat request feedback, wherein the feedback message is transmitted in accordance with the configuration.

Aspect 17: The method of any of aspects 1 through 16, wherein the feedback message is transmitted via uplink control information of a physical uplink control channel.

Aspect 18: The method of aspect 17, wherein a payload of the uplink control information is less than or equal to 11 bits.

Aspect 19: An apparatus for wireless communications at a UE, comprising a processor; memory coupled with the processor; and instructions stored in the memory and executable by the processor to cause the apparatus to perform a method of any of aspects 1 through 18.

Aspect 20: An apparatus for wireless communications at a UE, comprising at least one means for performing a method of any of aspects 1 through 18.

Aspect 21: A non-transitory computer-readable medium storing code for wireless communications at a UE, the code comprising instructions executable by a processor to perform a method of any of aspects 1 through 18.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), the method comprising:
   receiving first downlink control information corresponding to a first group of downlink transmissions and second downlink control information corresponding to a second group of downlink transmissions;
   calculating a number of information bits for a feedback message comprising first feedback for one or more downlink transmissions of the first group and second feedback for one or more downlink transmissions of the second group, the number of information bits comprising first information bits of the first feedback and second information bits of the second feedback;
   identifying a transmission power for the feedback message based at least in part on the calculated number of information bits; and
   transmitting the feedback message comprising the first feedback and the second feedback using the identified transmission power.

2. The method of claim 1, wherein calculating the number of information bits for the feedback message comprises:
   calculating the first information bits of the first feedback, wherein the first information bits of the first feedback comprises one or more feedback bits corresponding to downlink control information for the first group that the UE failed to receive and one or more feedback bits corresponding to a quantity of transport blocks of the first group received by the UE.

3. The method of claim 2, further comprising:
   receiving third downlink control information corresponding to the first group and fourth downlink control information corresponding to the second group, the third downlink control information being a last downlink control information message prior to transmitting the feedback message and received after the fourth downlink control information;
   identifying a value of a downlink assignment index of the third downlink control information, the value of the downlink assignment index indicating a total number of downlink control information messages of the first group transmitted to the UE from a network device; and
   calculating a difference between the value of the downlink assignment index and a number of downlink control information messages associated with the first group received by the UE, wherein calculating the first information bits of the first feedback is based at least in part on the calculated difference.

4. The method of claim 3, wherein calculating the first information bits of the first feedback comprises:
   multiplying the calculated difference by a predetermined threshold number of transport blocks per downlink shared channel.

5. The method of claim 1, wherein calculating the number of information bits for the feedback message comprises:
   calculating the second information bits of the second feedback, wherein the second information bits of the second feedback comprises one or more feedback bits corresponding to downlink control information for the second group that the UE failed to receive and one or more feedback bits corresponding to a quantity of transport blocks of the second group received by the UE.

6. The method of claim 5, further comprising:
   receiving third downlink control information corresponding to the first group and fourth downlink control information corresponding to the second group, the fourth downlink control information being a last downlink control information message prior to transmitting the feedback message and received after the third downlink control information;
   identifying a value of a downlink assignment index of the fourth downlink control information, the value of the downlink assignment index indicating a total number of downlink control information messages of the second group transmitted to the UE from a network device; and
   calculating a difference between the value of the downlink assignment index and a number of downlink control information messages associated with the second group received by the UE, wherein calculating the second information bits of the second feedback is based at least in part on the calculated difference.

7. The method of claim 6, wherein calculating the second information bits of the second feedback comprises:
   multiplying the calculated difference by a predetermined threshold number of transport blocks per downlink shared channel.

8. The method of claim 5, further comprising:
receiving third downlink control information corresponding to the first group and fourth downlink control information corresponding to the second group, the third downlink control information being a last downlink control information message prior to transmitting the feedback message and received after the fourth downlink control information;
identifying a value of a downlink assignment index of the third downlink control information, the value of the downlink assignment index indicating a total number of downlink control information messages of the second group transmitted to the UE from a network device; and
calculating a difference between the value of the downlink assignment index and a number of downlink control information messages associated with the second group received by the UE, wherein calculating the second information bits of the second feedback is based at least in part on the calculated difference.

9. The method of claim 1, further comprising:
identifying one or more parameters of the first downlink control information, the second downlink control information, or both;
generating the first feedback corresponding to the first group based at least in part on the one or more parameters; and
generating the second feedback corresponding to the second group based at least in part on the one or more parameters.

10. The method of claim 9, wherein the one or more parameters of the first downlink control information comprises an indication that the first downlink control information corresponds to the first group, a first new feedback indication field corresponding to the first group, a second new feedback indication field corresponding to the second group, an indication for the UE to generate the first feedback, an indication for the UE to generate both the first feedback and the second feedback, a downlink assignment index corresponding to the first group, a downlink assignment index corresponding to the second group, or any combination thereof.

11. The method of claim 9, wherein the one or more parameters of the second downlink control information comprises an indication that the second downlink control information corresponds to the second group, a first new feedback indication field corresponding to the first group, a second new feedback indication field corresponding to the second group, an indication for the UE to generate the second feedback, an indication for the UE to generate both the first feedback and the second feedback, a downlink assignment index corresponding to the first group, a downlink assignment index corresponding to the second group, or any combination thereof.

12. The method of claim 9, wherein generating the first feedback comprises:
generating an information bit for a first transport block scheduled by the first downlink control information, wherein a first entry of a first codebook corresponds to the first downlink control information and comprises the information bit for the first transport block.

13. The method of claim 12, further comprising:
generating an information bit for a second transport block scheduled by the first downlink control information, wherein the first entry of the first codebook comprises the information bit for the second transport block.

14. The method of claim 12, further comprising:
identifying a threshold number of transport blocks scheduled by downlink control information; and
appending one or more negative acknowledgment bits to the first entry of the first codebook, wherein a size of the first entry of the first codebook matches the threshold number of transport blocks.

15. The method of claim 1, wherein an information bit of the number of information bits indicates an acknowledgment or a negative acknowledgment.

16. The method of claim 1, further comprising:
receiving, from a network device, a configuration of an enhanced dynamic codebook for hybrid automatic repeat request feedback, wherein the feedback message is transmitted in accordance with the configuration.

17. The method of claim 1, wherein the feedback message is transmitted via uplink control information of a physical uplink control channel.

18. The method of claim 17, wherein a payload of the uplink control information is less than or equal to 11 bits.

19. An apparatus for wireless communications at a user equipment (UE), the apparatus comprising:
a processor;
memory coupled with the processor; and
instructions stored in the memory and executable by the processor to cause the apparatus to:
receive first downlink control information corresponding to a first group of downlink transmissions and second downlink control information corresponding to a second group of downlink transmissions;
calculate a number of information bits for a feedback message comprising first feedback for one or more downlink transmissions of the first group and second feedback for one or more downlink transmissions of the second group, the number of information bits comprising first information bits of the first feedback and second information bits of the second feedback;
identify a transmission power for the feedback message based at least in part on the calculated number of information bits; and
transmit the feedback message comprising the first feedback and the second feedback using the identified transmission power.

20. The apparatus of claim 19, wherein the instructions to calculate the number of information bits for the feedback message are executable by the processor to cause the apparatus to:
calculate the first information bits of the first feedback, wherein the first information bits of the first feedback comprises one or more feedback bits corresponding to downlink control information for the first group that the UE failed to receive and one or more feedback bits corresponding to a quantity of transport blocks of the first group received by the UE.

21. The apparatus of claim 20, wherein the instructions are further executable by the processor to cause the apparatus to:
receive third downlink control information corresponding to the first group and fourth downlink control information corresponding to the second group, the third downlink control information being a last downlink control information message prior to transmitting the feedback message and received after the fourth downlink control information;
identify a value of a downlink assignment index of the third downlink control information, the value of the downlink assignment index indicating a total number of downlink control information messages of the first group transmitted to the UE from a network device; and calculate a difference between the value of the downlink assignment index and a number of downlink control information messages associated with the first group received by the UE, wherein the instructions are executable by the processor to cause the apparatus to calculate the first information bits of the first feedback based at least in part on the calculated difference.

22. The apparatus of claim 21, wherein the instructions to calculate the first information bits of the first feedback are executable by the processor to cause the apparatus to:

multiply the calculated difference by a predetermined threshold number of transport blocks per downlink shared channel.

23. The apparatus of claim 19, wherein the instructions to calculate the number of information bits for the feedback message are executable by the processor to cause the apparatus to:

calculate the second information bits of the second feedback, wherein the second information bits of the second feedback comprises one or more feedback bits corresponding to downlink control information for the second group that the UE failed to receive and one or more feedback bits corresponding to a quantity of transport blocks of the second group received by the UE.

24. The apparatus of claim 23, wherein the instructions are further executable by the processor to cause the apparatus to:

receive third downlink control information corresponding to the first group and fourth downlink control information corresponding to the second group, the fourth downlink control information being a last downlink control information message prior to transmitting the feedback message and received after the third downlink control information;

identify a value of a downlink assignment index of the fourth downlink control information, the value of the downlink assignment index indicating a total number of downlink control information messages of the second group transmitted to the UE from a network device; and calculate a difference between the value of the downlink assignment index and a number of downlink control information messages associated with the second group received by the UE, wherein the instructions are executable by the processor to cause the apparatus to calculate the second information bits of the second feedback based at least in part on the calculated difference.

25. The apparatus of claim 24, wherein the instructions to calculate the second information bits of the second feedback are executable by the processor to cause the apparatus to:

multiply the calculated difference by a predetermined threshold number of transport blocks per downlink shared channel.

26. The apparatus of claim 23, wherein the instructions are further executable by the processor to cause the apparatus to:

receive third downlink control information corresponding to the first group and fourth downlink control information corresponding to the second group, the third downlink control information being a last downlink control information message prior to transmitting the feedback message and received after the fourth downlink control information;

identify a value of a downlink assignment index of the third downlink control information, the value of the downlink assignment index indicating a total number of downlink control information messages of the second group transmitted to the UE from a network device; and calculate a difference between the value of the downlink assignment index and a number of downlink control information messages associated with the second group received by the UE, wherein the instructions are executable by the processor to cause the apparatus to calculate the second information bits of the second feedback based at least in part on the calculated difference.

27. The apparatus of claim 19, wherein the instructions are further executable by the processor to cause the apparatus to:

identify one or more parameters of the first downlink control information, the second downlink control information, or both;

generate the first feedback corresponding to the first group based at least in part on the one or more parameters; and generate the second feedback corresponding to the second group based at least in part on the one or more parameters.

28. The apparatus of claim 27, wherein the one or more parameters of the first downlink control information comprises an indication that the first downlink control information corresponds to the first group, a first new feedback indication field corresponding to the first group, a second new feedback indication field corresponding to the second group, an indication for the UE to generate the first feedback, an indication for the UE to generate both the first feedback and the second feedback, a downlink assignment index corresponding to the first group, a downlink assignment index corresponding to the second group, or any combination thereof.

29. An apparatus for wireless communications at a user equipment (UE), the apparatus comprising:

means for receiving first downlink control information corresponding to a first group of downlink transmissions and second downlink control information corresponding to a second group of downlink transmissions;

means for calculating a number of information bits for a feedback message comprising first feedback for one or more downlink transmissions of the first group and second feedback for one or more downlink transmissions of the second group, the number of information bits comprising first information bits of the first feedback and second information bits of the second feedback;

means for identifying a transmission power for the feedback message based at least in part on the calculated number of information bits; and means for transmitting the feedback message comprising the first feedback and the second feedback using the identified transmission power.

30. A non-transitory computer-readable medium storing code for wireless communications at a user equipment (UE), the code comprising instructions executable by a processor to:

receive first downlink control information corresponding to a first group of downlink transmissions and second downlink control information corresponding to a second group of downlink transmissions;

calculate a number of information bits for a feedback message comprising first feedback for one or more downlink transmissions of the first group and second feedback for one or more downlink transmissions of the second group, the number of information bits comprising first information bits of the first feedback and second information bits of the second feedback;

identify a transmission power for the feedback message based at least in part on the calculated number of information bits; and transmit the feedback message comprising the first feedback and the second feedback using the identified transmission power.

31. The apparatus of claim 19, wherein the instructions are further executable by the processor to cause the apparatus to:

receive third downlink control information corresponding to the first group and fourth downlink control information corresponding to the second group, the third downlink control information being a last downlink control information message prior to transmitting the feedback message and received after the fourth downlink control information;

identify a value of a downlink assignment index of the third downlink control information, the value of the downlink assignment index indicating a total number of downlink control information messages of the second group transmitted to the UE from a network device;

calculate a difference between the value of the downlink assignment index and a number of downlink control information messages associated with the second group received by the UE; and calculate the second information bits of the second feedback based at least in part on the calculated difference.

* * * * *